United States Patent [19]
Murata et al.

[11] Patent Number: 5,333,055
[45] Date of Patent: Jul. 26, 1994

[54] VIDEO CAMERA CIRCUIT FOR PROCESSING IMAGE SIGNALS FROM AN IMAGE PICKUP DEVICE HAVING A MOSAIC COLOR FILTER

[75] Inventors: Haruhiko Murata, Moriguchi; Yukio Mori, Yawata; Akihiro Maenaka, Moriguchi; Masao Takuma, Toyonaka; Kiyotada Kawakami, Osaka; Toru Yamamoto, Daito; Toru Asaeda, Ikoma, all of Japan

[73] Assignee: Sanyo Electric Co., Ltd., Osaka, Japan

[21] Appl. No.: 21,473

[22] Filed: Feb. 23, 1993

[30] Foreign Application Priority Data

Feb. 24, 1992 [JP] Japan .................. 4-036076
Feb. 27, 1992 [JP] Japan .................. 4-040802
Mar. 26, 1992 [JP] Japan .................. 4-068361

[51] Int. Cl.⁵ .................. H04N 9/04; H04N 3/223
[52] U.S. Cl. .................. 348/239; 348/240; 348/242; 348/243
[58] Field of Search .................. 358/41, 42, 43, 44, 358/31, 21 R, 37, 39, 909, 22, 180; H04N 9/04, 3/223

[56] References Cited

U.S. PATENT DOCUMENTS 4,754,323 6/1988 Kaji .................. 358/44
4,951,125 8/1990 Kojima .................. 358/22

Primary Examiner—James J. Groody
Assistant Examiner—Sherrie Hsia
Attorney, Agent, or Firm—Armstrong, Westerman, Hattori, McLeland & Naughton

[57] ABSTRACT

A video camera circuit for processing an image signal from an image pickup device having a mosaic color filter comprises a field memroy control circuit for reading out a predetermined line of signal (CCD output data) from a field memory when the position of vertical interpolation has changed, first, second and third line memories for storing the signal from the field memory, a line memory control circuit for controlling signal writing in and reading out from the line memories to concurrently retrieve three lines of signal, a vertical interpolation block for preparing a signal at the position of interpolation based on the four lines of signal, and a Y/C separation block for separating a luminance signal and color difference signals from the signal at the position of interpolation.

11 Claims, 25 Drawing Sheets

FIG 13

| K | Luminance Signal (Y) | | | | Vertical Aperture Signal | | | |
|---|---|---|---|---|---|---|---|---|
| | K0 | K1 | K2 | K3 | K0 | K1 | K2 | K3 |
| 0.0 | 4 | 24 | 4 | 0 | -4 | 8 | -4 | 0 |
| 0.125 | 3 | 22 | 7 | 0 | -4 | 7 | -2 | -1 |
| 0.25 | 2 | 20 | 10 | 0 | -4 | 6 | 0 | -2 |
| 0.375 | 1 | 18 | 13 | 0 | -4 | 5 | 2 | -3 |
| 0.5 | 0 | 16 | 16 | 0 | -4 | 4 | 4 | -4 |
| 0.625 | 0 | 13 | 18 | 1 | -3 | 2 | 5 | -4 |
| 0.75 | 0 | 10 | 20 | 2 | -2 | 0 | 6 | -4 |
| 0.875 | 0 | 7 | 22 | 3 | -1 | -2 | 7 | -4 |
| 1.0 | 0 | 4 | 24 | 4 | 0 | -4 | 8 | -4 |

FIG.16

| VK | VERTICAL DIFFERENTIAL SIGNAL | | | COLOR SIGNAL | | | |
|---|---|---|---|---|---|---|---|
|  | K01 | K12 | K23 | Ka | Kb | Kc | Kd |
| 0.0 | 8 | 8 | 0 | 8 | 16 | 8 | 0 |
| 0.125 | 7 | 8 | 1 | 7 | 15 | 9 | 1 |
| 0.25 | 6 | 8 | 2 | 6 | 14 | 10 | 2 |
| 0.375 | 5 | 8 | 3 | 5 | 13 | 11 | 3 |
| 0.5 | 4 | 8 | 4 | 4 | 12 | 12 | 4 |
| 0.625 | 3 | 8 | 5 | 3 | 11 | 13 | 5 |
| 0.75 | 2 | 8 | 6 | 2 | 10 | 14 | 6 |
| 0.875 | 1 | 8 | 7 | 1 | 9 | 15 |  |
| 1.0 | 0 | 8 | 8 | 0 | 8 | 16 | 8 |

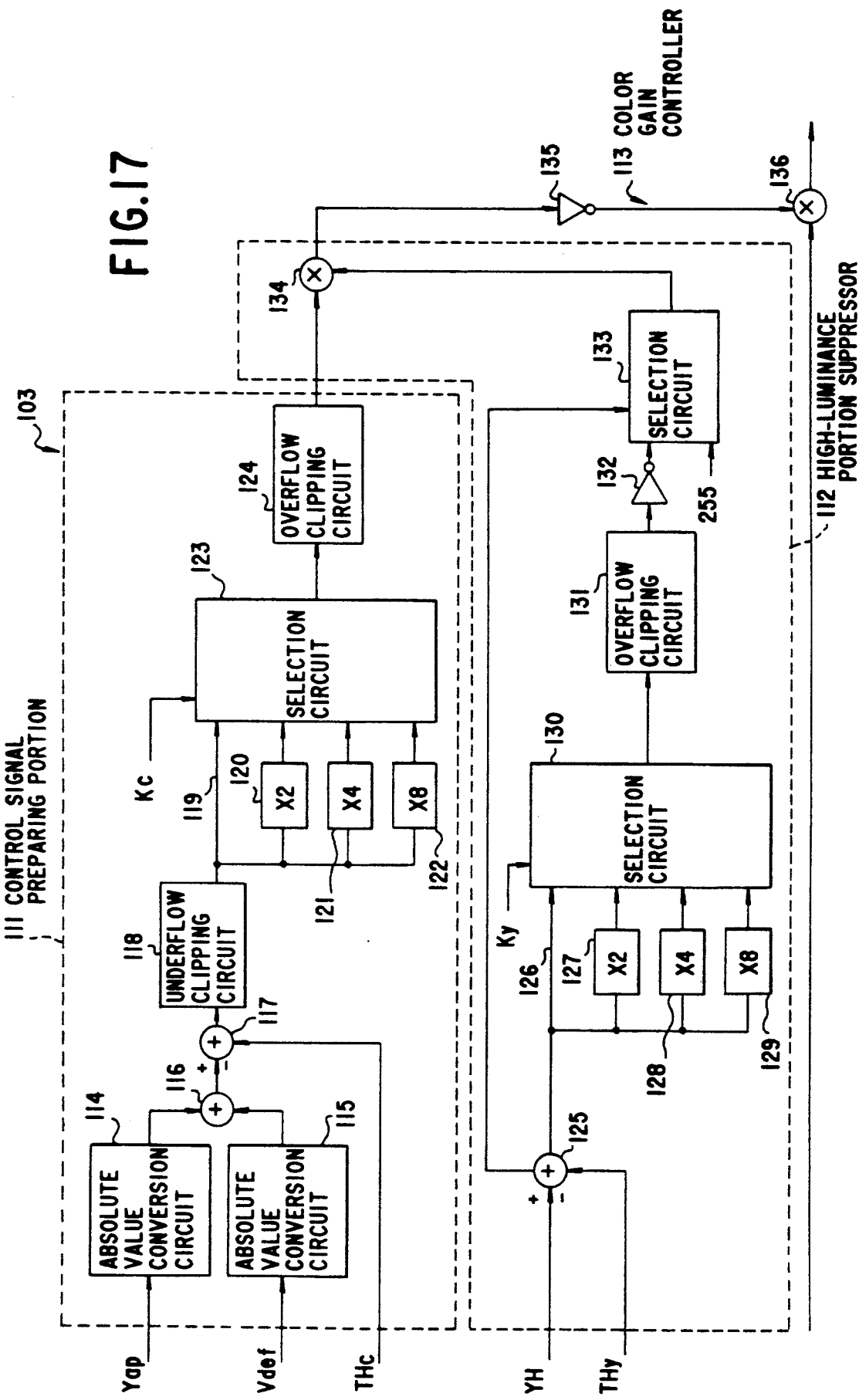

COLOR SUPPRESSION CONTROL SIGNAL (8 BITS)

|Vap| + |Vdf| (8 BITS)

GAIN ADJUSTING SIGNAL (8 BITS)

LUMINANCE SIGNAL Y (8 BITS)

COLOR SIGNAL GAIN (8 BITS)

CONTROL SIGNAL × GAIN ADJUSTING SIGNAL (8 BITS)

FIG.19(a) PRIOR ART — ARRANGEMENT IN COMPLEMENTARY COLOR FILTER

| R+B | G | R+B | G | R+B |
|-----|-----|-----|-----|-----|
| G+B | R+G | G+B | R+G | G+B |
| G | R+B | G | R+B | G |
| G+B | R+G | G+B | R+G | G+B |
| R+B | G | R+B | G | R+B |

FIG.19(b) PRIOR ART — ODD-NUMBERED FIELD IMAGE SIGNAL

| R+G+2B | R+2G | R+G+2B | R+2G |
| 2G+B | 2R+G+B | 2G+B | 2R+G+B |

FIG.19(c) PRIOR ART — EVEN-NUMBERED FIELD IMAGE SIGNAL

| 2G+B | 2R+G+B | 2G+B | 2R+G+B |
| R+G+2B | R+2G | R+G+2B | R+2G |

FIG.19(d) PRIOR ART — LOW-PASS LUMINANCE SIGNAL YL

| 2R+3G+2B | 2R+3G+2B | 2R+3G+2B | 2R+3G+2B |
| 2R+3G+2B | 2R+3G+2B | 2R+3G+2B | 2R+3G+2B |
| 2R+3G+2B | 2R+3G+2B | 2R+3G+2B | 2R+3G+2B |
| 2R+3G+2B | 2R+3G+2B | 2R+3G+2B | 2R+3G+2B |

FIG.19(e) PRIOR ART — COLOR DIFFERENCE SIGNAL

| 2B-G | -(2B-G) | 2B-G | -(2B-G) |
| -(2R-G) | 2R-G | -(2R-G) | 2R-G |

FIG.23(B) PRIOR ART — ODD-NUMBERED FIELD

FIG.23(C) PRIOR ART — EVEN-NUMBERED FIELD

ODD-NUMBERED FIELD

| | | | | | |
|---|---|---|---|---|---|
| Cb | 60 | 60 | 60 | 60 | L0 |
| Cr | 20 | 20 | 20 | 20 | L1 |
| Cb | 60 | 60 | 60 | 60 | L2 |
| Cr | 60 | 60 | 60 | 60 | L3 |

FIG.24(F)
PRIOR ART

EVEN-NUMBERED FIELD

| | | | | | |
|---|---|---|---|---|---|
| ---Cb | 60 | 60 | 60 | 60 | L0 |
| ---Cr | 20 | 20 | 20 | 20 | L1 |
| ---Cb | 80 | 80 | 80 | 80 | L2 |
| ---Cr | 60 | 60 | 60 | 60 | L3 |
| ---Cb | 60 | 60 | 60 | 60 | L4 |

FIG.24(G)
PRIOR ART

| | |
|---|---|
| YL=180  Cr=20  Cb=60 | L0 |
| YL=180  Cr=20  Cb=60 | L1 |
| YL=210  Cr=40  Cb=60 | L2 |
| YL=220  Cr=60  Cb=60 | L3 |

FIG.24(H)
PRIOR ART

| | |
|---|---|
| YL=180  Cr=20  Cb=60 | L0 |
| YL=185  Cr=20  Cb=70 | L1 |
| YL=200  Cr=40  Cb=80 | L2 |
| YL=215  Cr=60  Cb=70 | L3 |
| YL=220  Cr=60  Cb=60 | L4 |

FIG.24(I)
PRIOR ART

| Vap | | Vdf | |
|---|---|---|---|
| 0 | R=20  G=20  B=40 | 0 | L0 |
| -40 | R=21  G=22  B=41 | -40 | L1 |
| 40 | R=31  G=22  B=41 | -40 | L2 |
| 0 | R=40  G=20  B=40 | 0 | L3 |

FIG.24(J)
PRIOR ART

| Vap | | Vdf | |
|---|---|---|---|
| 0 | R=20  G=20  B=40 | 0 | L0 |
| -20 | R=19.5  G=19  B=44.5 | -20 | L1 |
| 0 | R=28  G=16  B=48 | -40 | L2 |
| 20 | R=38.5  G=17  B=43.5 | -20 | L3 |
| 0 | R=40  G=20  B=40 | 0 | L4 |

VIDEO CAMERA CIRCUIT FOR PROCESSING IMAGE SIGNALS FROM AN IMAGE PICKUP DEVICE HAVING A MOSAIC COLOR FILTER

1. FIELD OF THE INVENTION

The present invention relates to video cameras for use in video tape recorders which are adapted to have the camera incorporated therein, and more particularly, to a video camera circuit for processing image signals from an image pickup device equipped with a mosaic color filter.

2. DESCRIPTION OF THE RELATED ART

To meet a demand for video cameras of smaller size and reduced weight in recent years, digitalization of camera signal processing circuits is under investigation for converting analog signals from a CCD or similar image pickup devices to digital signals and processing the digital signals in various ways, for example, for zooming and separation of luminance signals from color signals.

FIG. 20 shows the construction of a common video camera having a camera signal processing circuit 58 of the digital type. The image beam obtained by an optical system 5 is photoelectrically converted by a CCD 51 to an analog signal, which is converted to a digital signal by an A/D converter 52. The digital signal is thereafter fed to the camera signal processing circuit 58. This circuit is controlled by a microcomputer 59.

For electrical zoom processing, the camera has a zoom processing circuit 53 which comprises a field memory 54 for storing one field of digital signal from the A/D converter 52, a zoom manipulator 56 for setting a desired zooming ratio and a memory control circuit 55 for reading out from the field memory 54 the digital signal of the image area (field angle) to be zoomed, in response to a command signal from the zoom manipulator 56.

The digital signal delivered from the A/D converter 52 and the digital signal read out from the field memory 54 are selectively fed to the camera signal processing circuit 58 via a selection circuit 57.

Image pickup devices comprising a CCD generally have, on its light incident side, a known complementary color filter having a mosaic arrangement as shown in FIG. 19(a). As illustrated, portions for passing red (R) and blue (B) rays therethrough and portions for passing green (G) rays therethrough are arranged alternately for pixels in an odd-numbered line, and portions for passing G and B rays and portions for passing R and G rays are arranged alternately for pixels in an even-numbered line. As schematically shown in FIGS. 19(b) and (c), the incident light outputs of vertically adjacent two lines are added to prepare a row of image signals of an odd-numbered field, and addition of incident light outputs of two lines deflected from the above lines by one line provides a row of image signals of an even-numbered field. The symbols R, G and B in FIG. 19(b) and (c) represent the color components included in the image signals. The image signals are stored in the field memory as CCD outputs.

Further prepared from the row of image signals of each field is a row of low-pass luminance signals schematically shown in FIG. 19(d), and a row of color difference signals schematically shown in FIG. 19(e). Stated more specifically, the sum of the CCD output of each pixel and that of another pixel adjacent thereto on the same line provides a low-pass (low-frequency) luminance signal (2R+3G+2B) shown in FIG. 19(d) and thus made low in frequency range by the addition of CCD outputs. The difference between the CCD output of each pixel and that of another pixel adjacent thereto on the same line provides either one of a pair of color difference signals (2B-G) and (2R-G). These color difference signals appear alternately from line to line, and are reversed in sign from pixel to pixel on each line.

The low-pass luminance signal will hereinafter be designated as YL, one of the color difference signals, (2B-G), as Cb, and the other color difference signal (2R-G) as Cr. The usual luminance signal involving low and high ranges will be referred to as a high-pass luminance signal YH, as distinguished from the low-pass luminance signal YL.

As shown in FIG. 21, the conventional camera signal processing circuit 58 comprises a Y/C separation block 6 for preparing high-pass luminance signals YH, low-pass luminance signals YL and color difference signals Cr and Cb from the digital signals from the A/D converter 52 or field memory 54, a luminance signal processing circuit 7 for processing high-pass luminance signals, for example, for edge emphasis, a color difference signal processing circuit 71 for preparing usual color difference signals (R-Y) and (B-Y) from color difference signals Cr and Cr, a vertical interpolation block 8 for subjecting the luminance signal and color difference signals from the luminance signal processing circuit 7 and the color difference signal processing circuit 71 to vertical interpolation in accordance with a zooming ratio, and an encoder 9 for encoding the luminance signals and color signals on each scan line obtained by the interpolation to prepare luminance signals Y and color signals C and deliver the signals to the subsequent circuit.

Although the camera signal processing circuit 58 also has a circuit for conducting horizontal interpolation involved in zoom processing, this circuit is not illustrated or described herein.

With the image pickup device having a complementary color filter, the two color difference signals Cr and Cb each appear on alternate lines (horizontal scan lines ) as seen in FIG. 19(e), so that there is a need to execute simultaneity processing with use of the signals of at least three consecutive lines in order to obtain two color difference signals Cr and Cb with respect to each line. For example when the color difference signals on a particular line are Cb, the color difference signals Cr present on the lines above and below the particular line are averaged to produce color difference signals Cr for the line by simulation since no color difference signal Cr is present on the line concerned.

For the above simultaneity processing, the conventional camera signal processing circuit 58 has two line memories 61, 62 in the Y/C separation block 6 as shown in FIG. 21 to obtain the digital image signals of three lines from the input-output terminals of these line memories. The digital image signals corresponding to the three lines are fed respectively to first, second and third Y/C separation circuits 63, 64, 65 and separated into low-pass luminance signals and color difference signals. The three low-pass luminance signals separated off are fed to a weighted average circuit 66 to give a low-pass luminance signal YL, which is fed to the color difference signal procssing circuit 71.

The color difference signal from the second Y/C separation circuit 64 is delivered as it is (as Cr or Cb) to the color difference signal processing circuit 71. The two color difference signals from the first and third Y/C separation circuits 63, 65 are fed to an averaging circuit 67, from which the average value of the signals is delivered as Cb (or Cr) to the color difference signal processing circuit 71.

The low-pass luminance signal YL and the color difference signal Cr or Cb can be derived according to the following mathematical expressions 1 where YL0, YL1, YL2 are the low-pass luminance signals of the three lines and Cr0, Cb1, Cr2 or Cb0, Cr1, Cb 2 are the color difference signals thereof, as made simultaneous by the line memories 61, 62 of FIG. 21. Mathematical expressions 1

$$YL = \tfrac{1}{2}(YL1 + \tfrac{1}{4}YL0 + \tfrac{1}{4}YL2)$$

$$Cr = Cr1, \text{ or } \tfrac{1}{2}(Cr0 + Cr2)$$

$$Cb = \tfrac{1}{2}(Cb0 + Cb2), \text{ or } Cb1$$

Three primary color signals R, G, B can be derived from the low-pass luminance signal and the color difference signals according to the following mathematical expressions 2.

Mathematical expressions 2

$$R = 1/10(YL - Cb + 4Cr)$$

$$G = 1/5(YL - Cr - Cb)$$

$$B = 1/10(YL - Cr + 4Cb)$$

The vertical interpolation block 8 shown in FIG. 21 has first, second and third line memories 81, 82, 83 for respectively storing three kinds of signals, i.e., a luminance signal Y from the luminance signal processing circuit 7 and two color difference signals (R-Y) and (B-Y) from the color difference signal processing circuit 71, whereby the luminance signal and the two color difference signals of two vertically consecutive lines are available at the same time. The signals of the two lines are fed respectively to first, second and third interpolation processing circuits 84, 85, 86 for vertical interpolation according to a particular zooming ratio.

The conventional camera signal processing circuit 58 has five line memories in total, i.e., two in the Y/C separation block 6, and three in the vertical interpolation block 8. Accordingly, if it is attempted to provide this circuit by a single-chip LSI, these five line memories occupy a large area relative to the entire chip to entail the problem of necessitating a large chip. The attempt also entails the problem that the five line memories require a great power consumption for driving.

Further when the position of interpolation is present between vertically adjacent two lines in the case of conventional interpolation processing circuits, the weighted average of signals on the two lines is output as an interpolation signal, whereas when the position of interpolation is present on the original line, the coefficient of interpolation is zero, and the signal on the orignal line is output as it is as an interpolation signal. Consequently, the former interpolation signal is lower than the latter interpolation signal in resolution with resect to the vertical direction.

Accordingly, in the case where the conventional interpolation circuit is used for realizing vertical electrical zoom especially at a low magnification, the area of high resolution and that of low resolution appear periodically with respect to the vertical direction, and the variation in resolution increases as the zooming magnification lowers.

The conventional video camera has another problem because the aforementioned mosaic color filter is used therein. If the input image has a portion of marked variation in luminance or color, the three primary color signals derived according to the mathematical expressions 2 for this portion will not be restored with high fidelity to the three primary color signals composing the original input image, permitting production of false color signals. This problem will be described below.

Now, suppose a subject has a portion where light blue abruptly changes to light magenta as shown at the left of FIG. 23, (A) showing the color filter, and an image of the subject impinges on the filler. The image pickup device then produces the CCD outputs shown in FIG. 23, (B) and (C) for an odd-numbered field and even-numbered field, respectively. The Y/C separation of the CCD output signals provides low-pass luminance signals YL of the level shown in FIG. 23, (D) and (E), and color signals Cr and Cb of the level shown in FIG. 24, (F) and (G). Application of the mathematical expressions 1 to these signals gives low-pass luminance signals and color difference signals for the respective lines as seen in FIG. 24, (H) and (I). Application of the mathematical expressions 2 to these signals further affords three primary color signals R, G and B as shown in FIG. 24, (J) and (K).

As will be apparent from FIG. 24, (J) and (K), however, the three primary color signals R, B, G of the original subject are not reproduced but false color signals are produced in the odd-numbered field over the two lines L1, L2 corresponding to the abrupt color transition portion of the subject and in the even-numbered field similarly over the three lines L1, L2, L3.

SUMMARY OF THE INVENTION

An object of the present invention is to provide a camera signal processing circuit which has a smaller number of line memories for effecting zoom processing and Y/C separation than the prior art and which can be reduced in size and power consumption.

According to the present invention, therefore, signals of four lines are obtained with use of three line memories and thereafter subjected to vertical interpolation processing and Y/C separation to thereby eliminate interpolation by three line memories which is conventionally conducted separately from the Y/C process and to realize a camera signal processing circuit which is reduced to three in the number of line memories.

The camera signal processing circuit of the present invention comprises a field memory control circuit for reading out from a field memory a digital signal of the lowermost of four horizontal scan lines which are two lines above and two lines below a new position of vertical interpolation when the position of interpolation has changed, first, second and third line memories for storing the digital signal of three horizontal scan lines from the field memory each from line to line, a line memory control circuit for controlling digital signal writing in and reading out from the first, second and third line memories to concurrently retrieve the digital signal of the upper three of the four horizontal scan lines, a vertical interpolation circuit for preparing a digital signal on a horizontal scan line at the position of interpolation based on the digital signal of the four horizontal scan lines, and a Y/C separation circuit for separating a luminance signal and color difference signals (Cr and Cb) from the digital signal to output the separated signals.

The camera signal processing circuit has only three line memories, is yet adapted to effect vertical interpolation and Y/C separation, is smaller in the number of line memories than in the prior art, therefore has a diminished size and achieves reductions in power consumption.

Another object of the present invention is to provide a vertical interpolation circuit for giving a uniform resolution over the entire image area irrespective of the position of vertical interpolation on the image screen.

The vertical interpolation circuit embodying the invention for use in video cameras has first, second and third line memories connected in series with an output terminal for a digitalized CCD output signal and each set to a delay time of one horizontal scan period (1H). The CCD output signal and the output signals from the first, second and third line memories are fed to four-tap vertical interpolation filters, so that vertical interpolation is effected at a vertical position between the middle two lines based on the output signals of the four lines.

With the above vertical interpolation circuit, the interpolation involves a plurality of lines at all times irrespective of the position of interpolation, whereby the resolution in the image screen area is averaged with respect to the vertical direction and made free from great variations.

Still another object of the present invention is to provide a video camera circuit which is adapted to effectively inhibit false color signals.

According to the invention, production of false color signals is detected using a linear differential signal of luminance signals with respect to the vertical direction, for example, a differential signal of two of vertically adjacent three lines other than the middle line thereof, and the level of color signals is suppressed at the location where false color signals are produced, whereby the false color signals included in color signals have their level suppressed to inhibit reproduction of false colors.

BRIEF DESCRIPTION OF THE DRAWINGS

FIG. 13 is a table corresponding to FIG. 12 and showing specific examples of tap coefficients;

FIG. 16 is a table corresponding to FIG. 15 and showing specific examples of tap coefficients;

FIG. 17 is a block diagram showing the construction of a false color signal suppression circuit;

FIGS. 19(a)-(e) include diagrams for illustrating the principle of Y/C separation for a CCD having a complementary color filter;

FIGS. 23(A)-(E) include diagrams illustrating the first half of a process wherein false color signals are produced;

FIGS. 24(F)-(K) include diagrams illustrating the second half of the process; and FIGS. 25(A)-(F) include diagrams for illustrating objections due to the distortion of CCD output in a high luminance state.

DETAILED DESCRIPTION OF EMBODIMENTS

Embodiments of the present invention will be described below with reference to the drawings.

Figure 1:
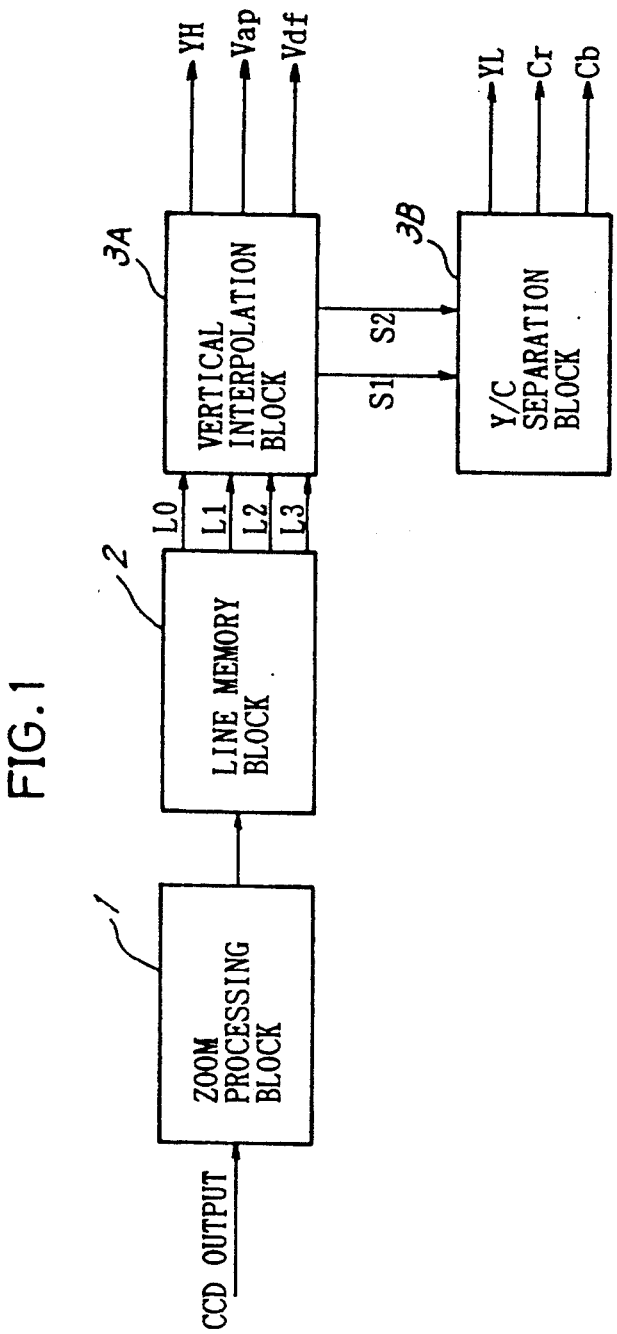
FIG. 1 is a block diagram showing the construction of a video camera embodying the invention.

FIG. 1 shows a camera signal processing circuit which comprises a zoom processing block 1, line memory block 2, vertical interpolation block 3A and Y/C separation block 3B which are connected together in series.

Figure 2:
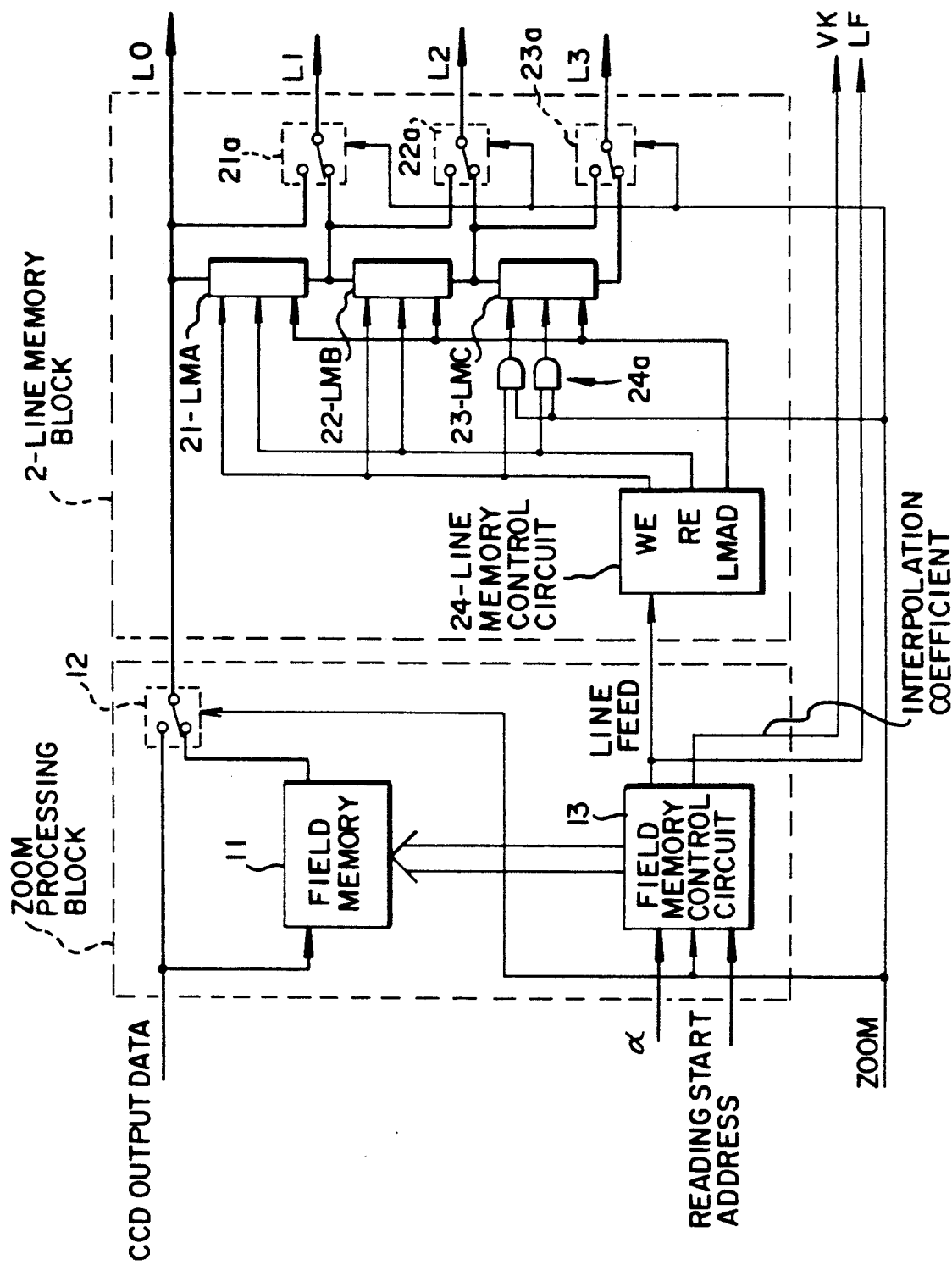
FIG. 2 is a block diagram showing the construction of a zoom processing block and a line memory block.

The zoom processing block 1 comprises, as shown in FIG. 2, a field memory 11 for writing in a quantity of CCD output data corresponding to one field, and a field memory control circuit 13 for reading out the signal (CCD output data) stored in the field memory 11 and covered by a field angle for zooming.

Figure 22:
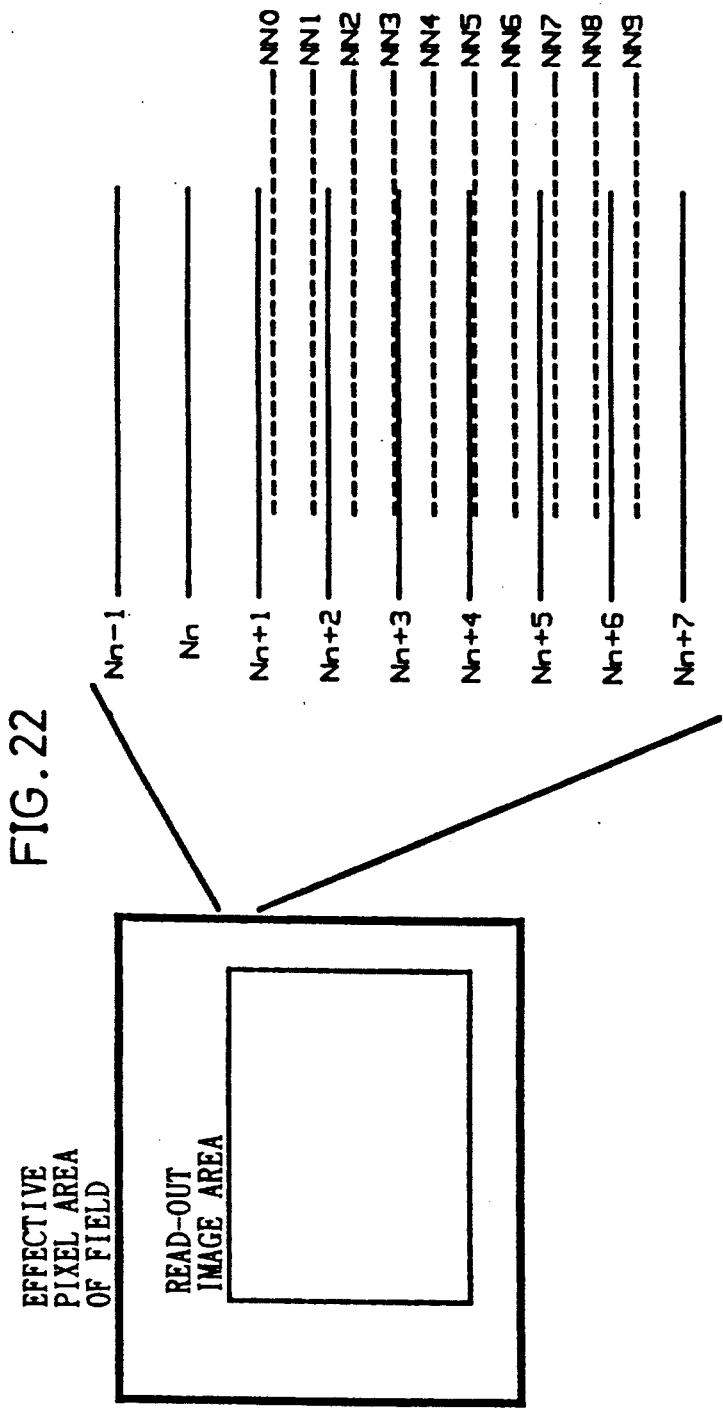
FIG. 22 is a diagram for illustrating the principle of zoom processing with respect to the vertical direction.

FIG. 22 shows the line positions of the CCD data of one field in solid lines, and the line positions of the signals produced after interpolation involved in zoom processing in broken lines. The lines NN0 and NN1 indicated in broken lines are prepared by interpolation from two lines above and two lines below these lines, i.e., from the four lines Nn, Nn+1, Nn+2, Nn+3 indicated in solid lines. The line NN2 is prepared from the lines Nn+1, Nn+2, Nn+3, Nn+4 by interpolation. Thus, the lines after zooming differ from the CCD output lines in pitch, so that for vertical zooming, the CCD data must be retrieved in conformity with the lines after zooming.

The zoom processing block 1 of FIG. 2 is therefore so adapted that after the CCD output data of one field has been written in the field memory 11, the field memory control circuit 13 reads out the CCD signal in conformity with the lines after zooming. When no zooming is effected, the CCD output data is not stored in the field memory 11 but fed directly to the subsequent line memory block 2 by the operation of a selection circuit 12.

A microcomputer (not shown) feeds to the field memory control circuit 13 a zooming signal ZOOM which is "high" while the camera is manipulated for zooming, a zooming coefficient $\alpha$ (1/zooming magnification) and a reading start address for the field memory 11. In response to this, the circuit 13 prepares and outputs a line feed signal LF commanding a change of CCD output line according to a change in the position of interpolation, and an interpolation coefficient VK necessary for the calculation of vertical interpolation. The construction of the field memory control circuit 13 will be described more specifically later.

The line memory block 2 has connected in series three line memories, i.e., a first line memory LMA 21, second line memory LMB 22 and third line memory LMC 23 each for writing one line of CCD output data in.

Data writing in and reading out from these line memories is controlled by a line memory control circuit 24, which also effects control for feeding to the vertical interpolation block 3A the CCD output data read out from the three line memories and the CCD output data of the line currently input. The line feed signal from the field memory control circuit 13 controls writing in the line memories. The construction of the line memory control circuit 24 will be described in greater detail later.

It therefore follows that the line memory block 2 delivers to the vertical interpolation block 3A the CCD output data of four lines L0 to L3 which are always vertically adjacent on the CCD.

The line memory block 2 further has circuits which operate when no zooming is effected, i.e., selection circuits 21a, 22a, 23a respectively for outputting the current CCD output data as line L1, the data read out from the first line memory 21 as line L2 and the data read out from the second line memory 22 as line L3.

The vertical interpolation block 3A produces the signal of a line between L1 and L2 according to the position of vertical interpolation, from the CCD output data of the lines L0 to L3. More specifically, the same signal as of the line L2 is produced when the coefficient of vertical interpolation is 0, and as the interpolation coefficient approaches 1, the position of the signal produced becomes closer to the line L1.

Figure 3:
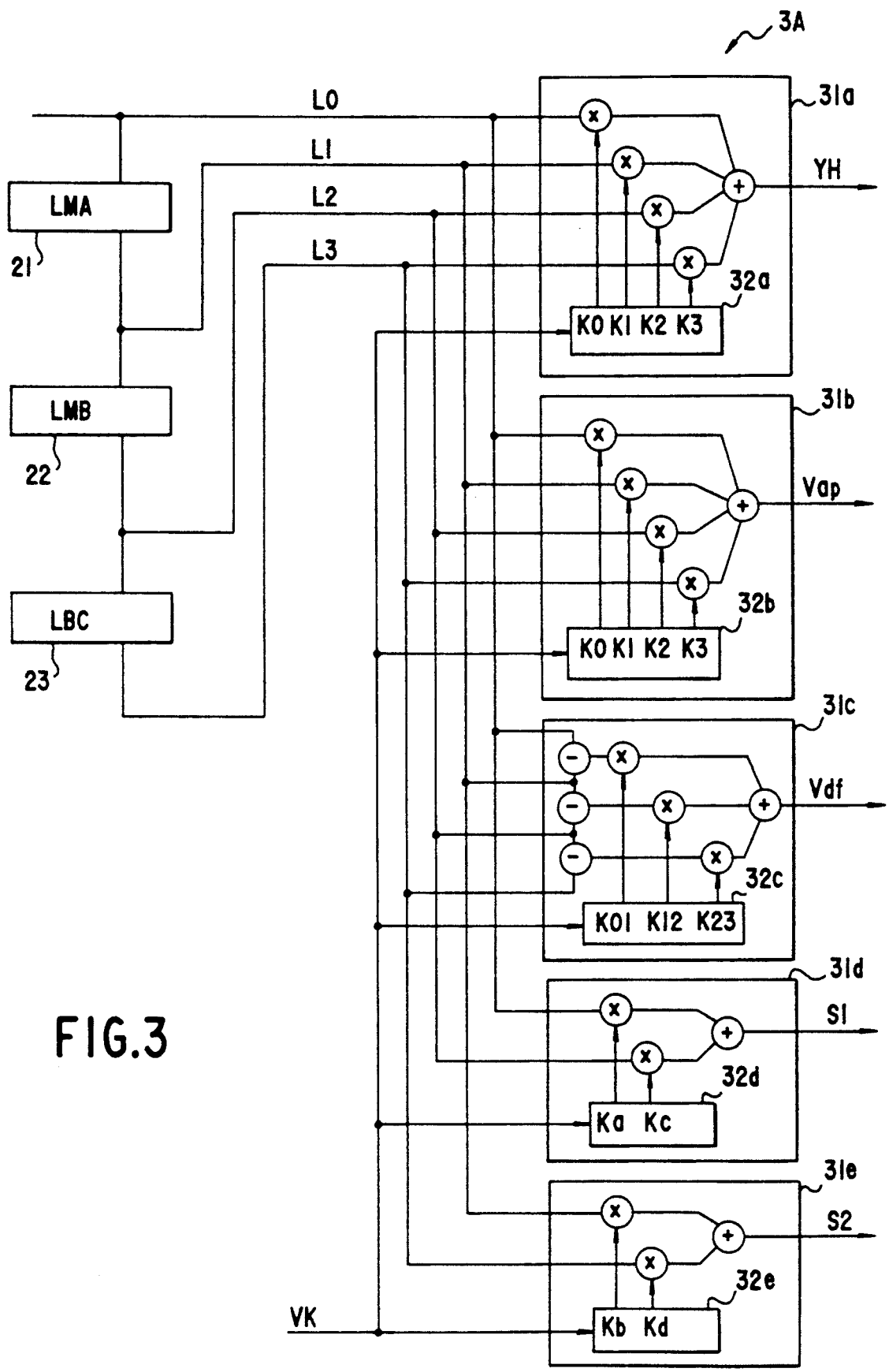
FIG. 3 is a block diagram showing the construction of a vertical interpolation block.

With reference to FIG. 3, the vertical interpolation block 3A comprises first to fifth vertical interpolation filters 31a, 31b, 31c, 31d, 31e. These filters are equipped with first to fifth coefficient setting circuits 32a, 32b, 32c, 32d, 32e, respectively, for determining tap coefficients. Of the signals of four lines L0 to L3 made simultaneous by the three line memories 21, 22, 23, those to be described below are fed to the vertical filters 31a, 31b, 31c, 31d, 31e. The vertical interpolation coefficient VK is input to the coefficient setting circuits 32a, 32b, 32c, 32d, 32e.

The signals of the four lines L0 to L3 are fed to each of the first, second and third filters 31a, 31b, 31c, which in turn produce a high-pass luminance signal YH, vertical aperture signal Vap and vertical differential signal Vdf, respectively. The vertical aperture signal Vap serves to emphasize the contour with respect to the vertical direction, and the vertical differential signal Vdf acts to suppress false color signals.

To the fourth filter 31d are applied the signals of the top line and third line, i.e., the two lines L0, L2. To the fifth filter 31e are applied the signals of the second and fourth lines, i.e., the two lines L1, L3. Thus, a pair of signals S1 and S2 are prepared which are to be fed to the Y/C separation block 3B.

As illustrated, each of the interpolation filters is basically adapted to multiply the input signal of each of the plurality of lines by a vertical interpolation coefficient in accordance with the position of interpolation by multiplying means, calculate the sum of the resulting products by an adder and feed the sum to the subsequent circuit.

Figure 4:
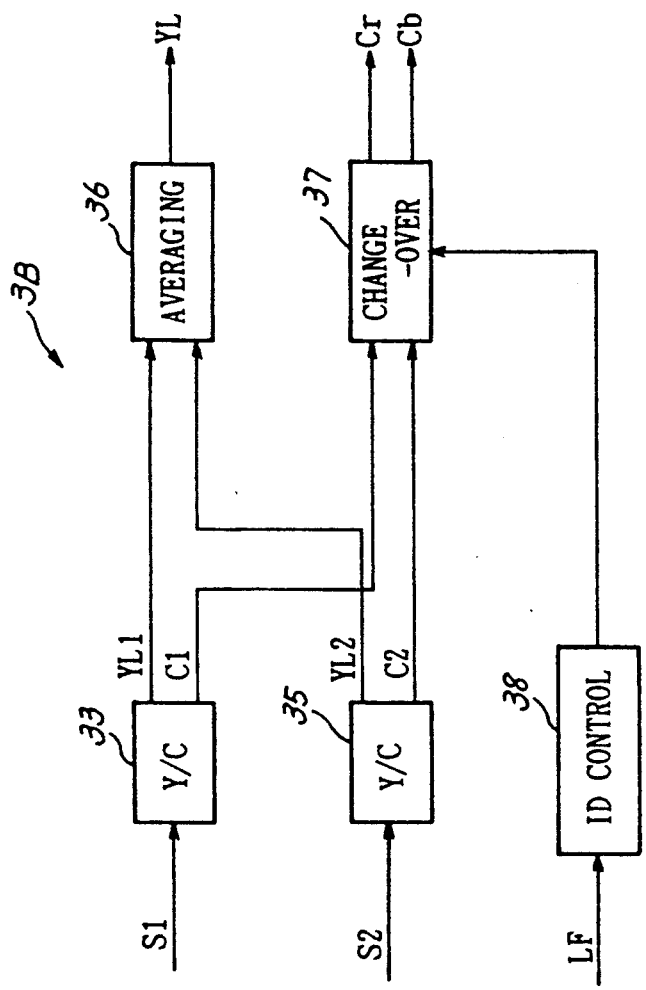
FIG. 4 is a block diagram showing the construction of a Y/C separation block.

The outputs of the fourth and fifth filters 31d, 31e are divided respectively by first and second Y/C separation circuits 33, 35 into luminance data YL1, YL2 and color data C1, C2 as shown in FIG. 4. The color data C1, C2 provides the color difference signals Cr and Cb of FIG. 19(e) which are linear sequential signals. Accordingly, the color data C1, C2 is fed to a change-over circuit 37, which rearranges the items of color data according to a Cr/Cb identification signal prepared based on the line feed signal LF, and always delivers the color difference signal Cr from one of its output terminals and the color difference signal Cb from the other output terminal. The ID control signal is reversed every time the line feed signal LF is input.

On the other hand, the items of luminance data YL1, YL2 are fed to an averaging circuit 36, which outputs the average value of the data as the low-pass component YL of the luminance signal (low-pass luminance signal).

The construction described above makes it possible to obtain the data of vertically adjacent four lines on the CCD, i.e., the high-pass luminance signal YH, low-pass luminance signal YL and color difference signals Cr, Cb at an optional line position (interpolation position with respect to the vertical direction) between the lines L1 and L2.

Figure 5:
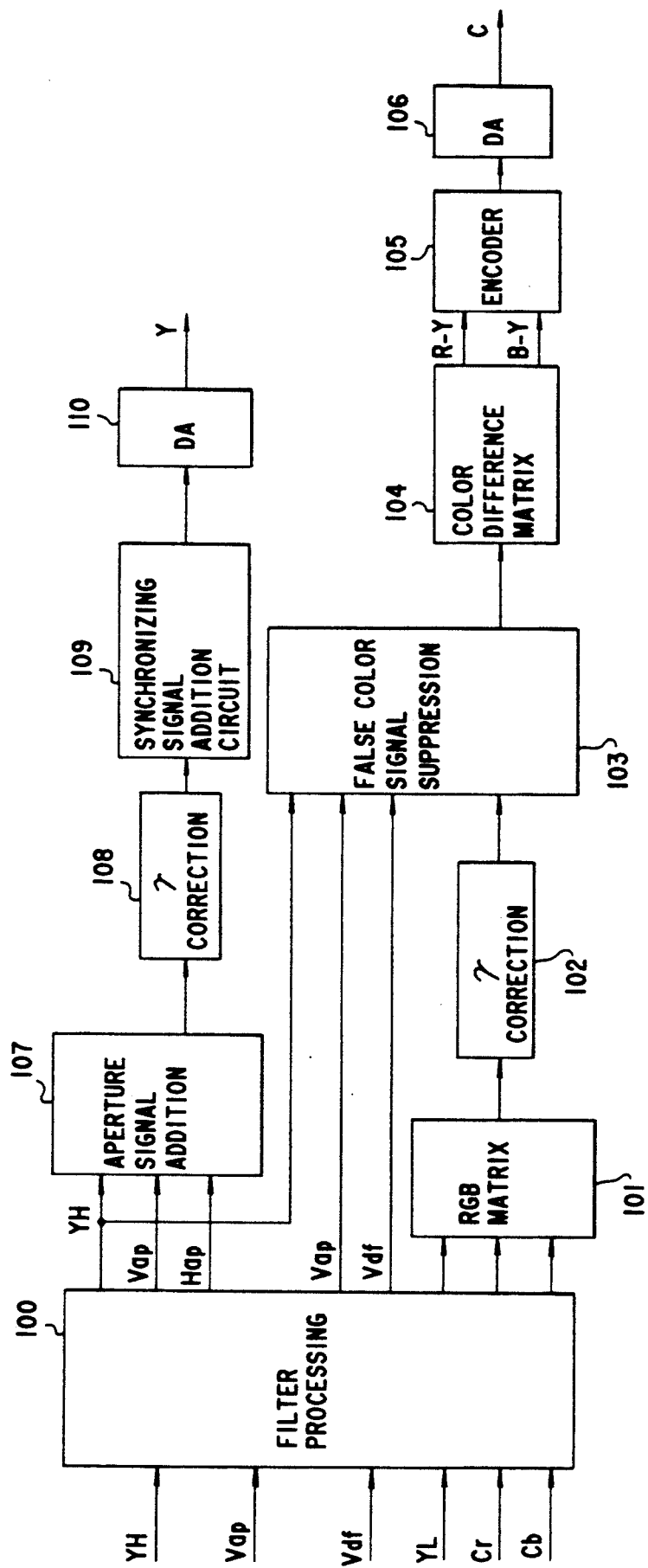
FIG. 5 is a block diagram to be connected and subsequent to the circuit of FIG. 1.

The high-pass luminance signal YH, vertical aperture signal Vap, vertical differential signal Vdf, low-pass luminance signal YL and color signals Cr, Cb thus obtained are fed to a filter processing circuit 100 as shown in FIG. 5, which imposes required band limitations on these signals and prepares a horizontal aperture signal Hap.

The high-pass luminance signal YH, vertical aperture signal Vap and horizontal aperture signal Hap obtained from the filter processing circuit 100 are fed to an aperture signal addition circuit 107, in which the vertical aperture signal Vap and horizontal aperture signal Hap are added to the high-pass luminance signal YH for the emphasis of contour.

The luminance signal YH thus emphasized is input to a gamma correction circuit 108 and then to a synchronizing signal addition circuit 109, which in turn adds horizontal and vertical synchronizing signals to the signal YH. The resulting signal is delivered as an analog luminance signal Y by way of a DA conversion circuit 110.

The low-pass luminance signal YL and the color difference signals Cr, Cb passing through the filter processing circuit 100 are fed to an RGB matrix circuit 101, which affords R, G and B signals according to the foregoing mathematical expressions 2. These R, G and B signals are input to a false color signal suppression circuit 103 via a gamma correction circuit 102.

This signal suppression circuit 103 has fed thereto from the filter processing circuit 100 the high-pass luminance signal YH, vertical aperture signal Vap and vertical differential signal Vdf. These signals Vap and Vdf serve to suppress the signal level of the R, G and B signals containing false color signals.

A description will now be given of the principle of the false color signal suppression to be made by the false color signal suppression circuit 103 based on the vertical differential signal Vdf. This differential signal Vdf is a signal representing a linear differential of luminance signals with respect to the vertical direction of the screen. Suppose the luminance signals of vertically adjacent three lines are YLn, YLn+1 and YLn+2. The linear differential on the middle line is then expressed approximately by the following mathematical expression 4.

Mathematical expression 4

$$Vdf = (YLn - YLn+1) + (YLn+1 - YLn+2) = YLn - YLn+2$$

The values of vertical differential signal Vdf thus calculated are given at the right of FIGS. 24, (J) and (K). It is seen that the vertical differential signal Vdf conventionally occurs at the portion where false color signals are produced in odd-numbered fields and also in even-numbered fields.

Accordingly, if the level of R, G and B color signals is suppressed at the location where false color signals are produced upon detecting the false color signals with reference to the vertical differential signal Vdf, the level of the false signals contained in the color signals can also be suppressed at the same time to inhibit reproduction of the false color.

Now suppose production of false color signals is to be detected with reference to the vertical aperture signal Vap only. The following problem will then be encountered.

The vertical aperture signal Vap is a signal representing a quadratic differential signal of luminance signals with respect to the vertical direction of the screen. Suppose the luminance signals of vertically adjacent three lines are YLn, YLn+1 and YLn+2. The differential signal is then expressed by the following mathematical expression 5.

Mathematical expression 5

$$Vap = (YLn + 1 - YLn + 2) - (YLn - YLn + 1)$$
$$= 2YLn + 1 - YLn - YLn + 2$$

With reference to the example of FIGS. 24(F)–(K), the values of vertical aperture signal Vap calculated from the expression 5 are given at the left of the diagrams (J) and (K). In the odd-numbered field shown in the diagram (J), the vertical aperture signal Vap occurs on the lines L1 and L2 where false color signals are produced, so that the false color signals can be suppressed using the absolute value |Vap| of the signal Vap as a color suppression control signal. In the even-numbered field shown in the diagram (K), however, Vap=0 on the line L2 among the lines L1, L2, L3 where false color signals are present, with the result that the false color signal of the line L2 can not be suppressed.

According to the present invention, on the other hand, the vertical differential signal Vdf is present also on the line L2 of the even-numbered field, and the false color signal occurring can be reliably detected with reference to the vertical differential signal Vdf.

With the present embodiment, the vertical differential signal Vdf and the vertical aperture signal Vap are used in combination for locating false color signals.

The RGB signals with the false color signals thus suppressed are fed to a color difference matrix circuit 104 shown in FIG. 5 and thereby converted to a pair of color difference signals (R-Y) and (B-Y), which are then fed to an encoder 105 and then to a DA converter 106 to deliver an analog color modulation signal C on conversion.

Next, a description will be given in greater detail of the zoom processing block 1, line memory block 2, vertical interpolation block 3A and false color signal suppression circuit 103.

Figure 6:
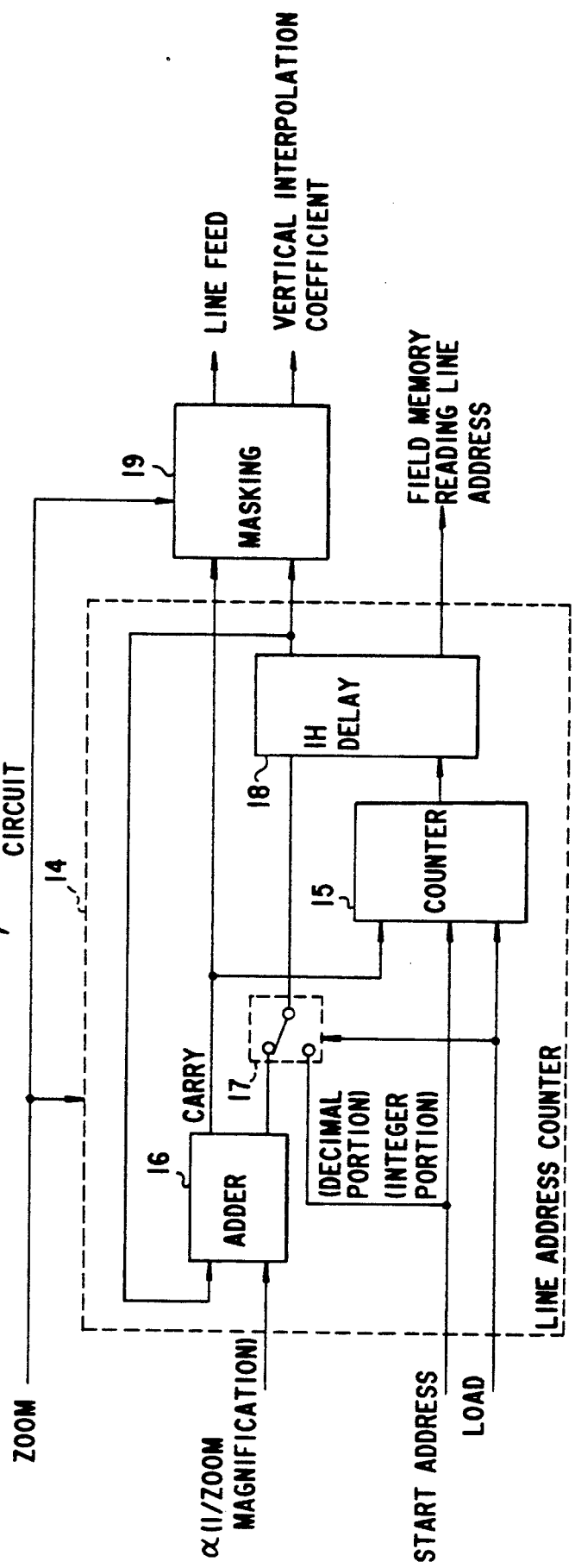
FIG. 6 is a block diagram showing the construction of a field memory control circuit.

The field memory control circuit 13 provided in the zoom processing block 1 has a line address counter 14 shown in FIG. 6. Reading line address control of the field memory 11 is effected using a reading start line address (start address) supplied from the microcomputer (not shown) and the reciprocal of a zooming magnification, i.e., zooming coefficient α similarly supplied.

More specifically, the line address counter 14 loads the integer portion of the start address onto a counter 15 for the start of reading from the field memory. On the other hand, the decimal portion of the start address is loaded onto a totaling circuit in the form of a closed loop including an adder 16 by way of a selection circuit 17. The totaling circuit adds up the zooming coefficient α upon a change-over of the selection circuit 17 after the start of reading, and feeds a carrying-up signal resulting from totaling, i.e., a carry, to the counter 15.

With the carry fed, the counter 15 advances the reading line address. When no carry is produced, the output of the counter 15 remains unchanged, permitting the same line to be read out continuously. The carry is output also as a line feed signal for controlling writing in the subsequent line memories, and the result of totaling is output as an interpolation coefficient representing the position of interpolation with respect to the vertical direction.

Figure 9:
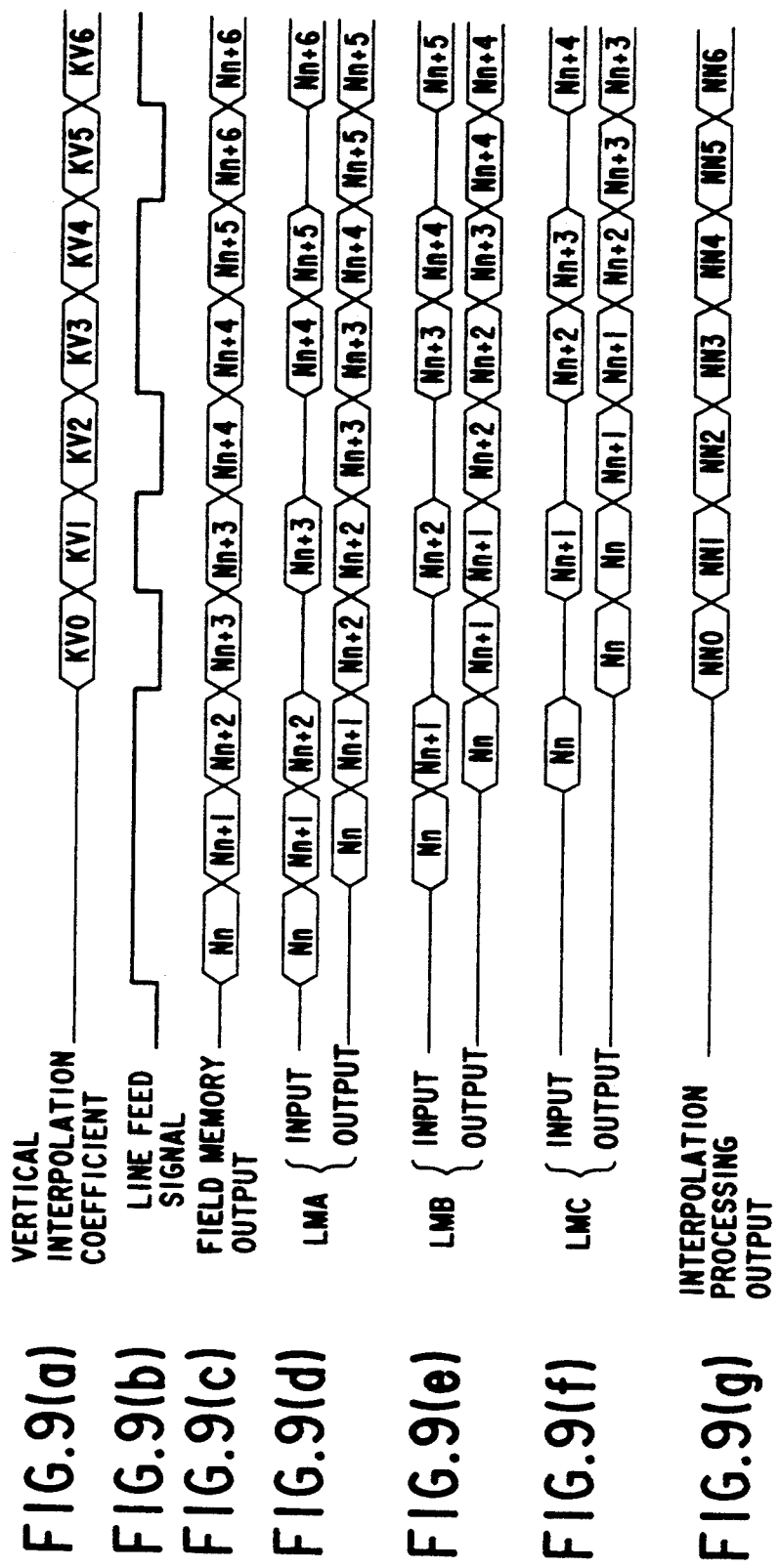
FIGS. 9(a)-(g) are timing charts showing the operation of the line memory block.

To write data in the line memories when the line to be read out from the field memory changes to the next line, the selection circuit 17 and the counter 15 are provided at their output terminals with a 1H delay circuit 18 for making the timing of the line feed signal earlier than the vertical interpolation coefficient and the reading start line address by one horizontal scanning period (1H) (see FIG. 9).

When zooming is not done, the CCD output is selected by the selection circuit 12 of FIG. 2 with no signal read out from the field memory, so that according to the signal ZOOM representing that no zoom processing is to be executed, the line address counter 14 of FIG. 6 is brought out of operation, and a masking circuit 19 functions to keep the line feed signal "high" at all times and set the vertical interpolation coefficient to zero.

Figure 7:
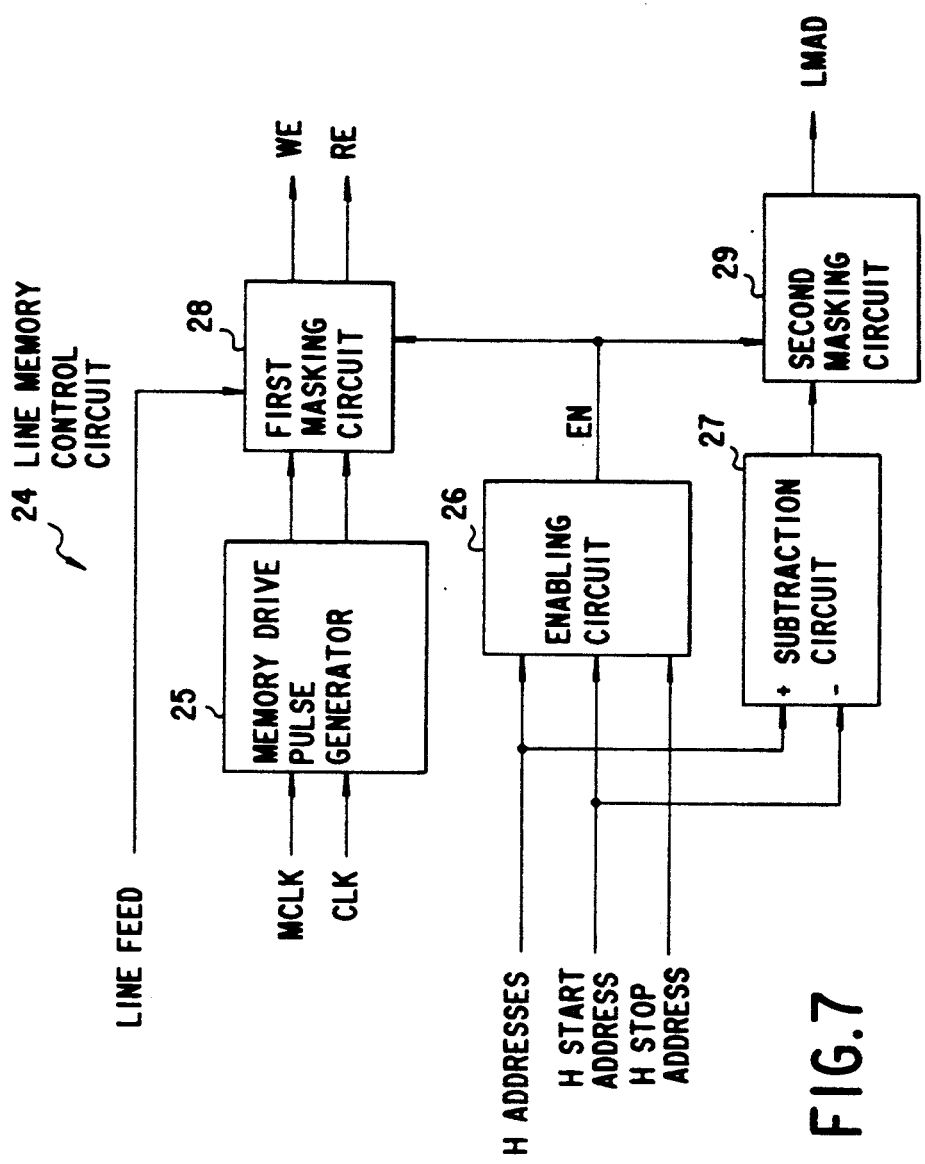
FIG. 7 is a block diagram showing the construction of a line memory control circuit.
Figure 8:
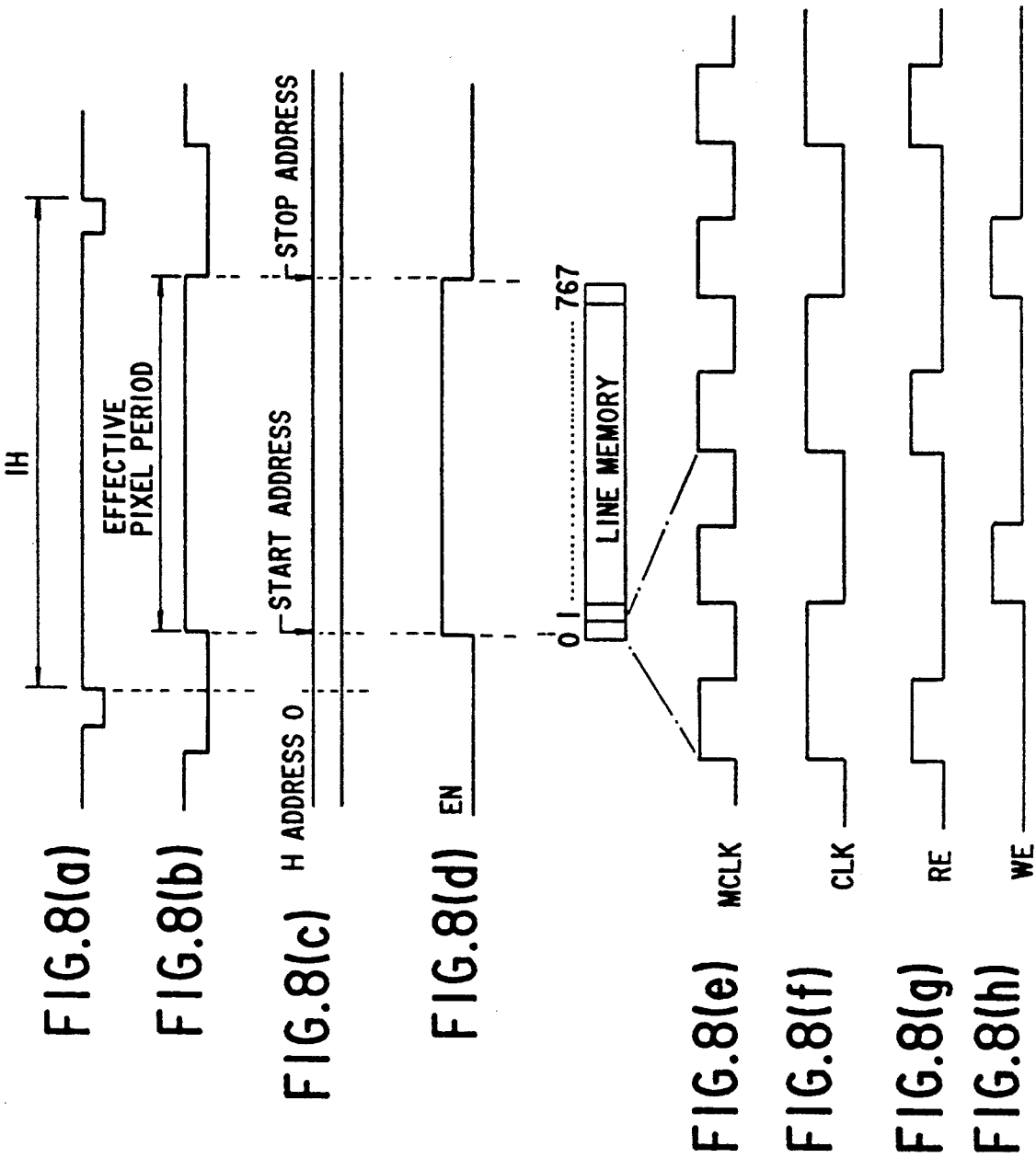
FIGS. 8(a)-8(h) are timing charts showing the operation of the line memory control circuit.

FIG. 7 shows the construction of the line memory control circuit 24, and FIG. 8 represents the operation of the circuit. The circuit 24 causes the line memories to store the data only during an effective pixel period included in one horizontal scanning period.

With reference to FIG. 7, pixel addresses (H addresses) on one line, H start address representing the start position of effective pixels and H stop address representing the end position of effective pixels are fed to an enabling circuit 26, which in turn prepares an enabling signal EN shown in FIG. 8(d). The enabling signal EN is fed to first and second masking circuits 28, 29 of FIG. 7 as a masking signal.

The H addresses and the H start address are fed also to a subtraction circuit 27, which prepares line memory addresses ("0" to "767") including the H start address as the initial value "0". These addresses are fed to the second masking circuit 29 as an input signal.

Consequently, a line memory address signal LMAD having a normal value only during the effective pixel period is fed to the first, second and third line memories 21, 22, 23 shown in FIG. 2.

For controlling the line memories for writing in and reading out, an external clock signal MCLK and an internal clock signal CLK shown in FIGS. 8, (e) and (f) are produced. These clock signals are fed to a memory drive pulse generator circuit 25 of FIG. 7 which prepares a read enabling signal RE and a write enabling signal WE shown in FIGS. 8, (g) and (h). The enabling signals are fed to the first masking circuit 28 of FIG. 7 as input signals.

The line feed signal serving as a masking signal is applied to the first masking circuit 28 along with the enabling signal EN, with the result that the circuit 28 outputs the read enabling signal RE only during the effective pixel period and the write enabling signal WE only while the line feed signal is "high" within the effective pixel period.

FIG. 9 shows the operation of the line memory block 2 shown in FIG. 2.

The line memories LMA 21, LMB 22 and LMC 23 are controlled by the line feed signal for writing in. While the line feed signal is "high", signals are read out from the line memories LMA 21, LMB 22 and LMC 23, and at the same time, the output of the field memory 11 is written in the line memory LMA, the output of the line memory LMA in the line memory LMB and the output of the line memory LMB in the line memory LMC. While the line feed signal is "low", the operation of reading out signals from the line memories LMA, LMB and LMC only is conducted.

As a result, the four outputs of the field memory 11, and the line memories LMA 21, LMB 22 and LMC 23 are always the signals of the four lines L0, L1, L2 and L3 which are vertically adjacent to one another on the CCD.

For example when a signal is produced by interpolation at the position of an interpolation coefficient KV1, the line feed signal is "high" and the signal of line Nn+3 is output from the field memory. At this time, the line memories LMA, LMB, LMC output the signals of lines Nn+2, Nn+1, Nn previously written therein, and at the same time, the output signal of the field memory is written in the line memory LMA, the output signal of the line memory LMA in the line memory LMB, and output signal of the line memory LMB in the line memory LMC.

For vertical interpolation, a signal NN1 is prepared at the position of interpolation coefficient KV1 according to the outputs of the field memory and the three line memories, i.e., the signals of lines Nn+3, Nn+2, Nn+1, Nn.

With respect to the next position of interpolation coefficient KV2, the line feed signal is "low", and the field memory outputs the signal of line Nn+4. At this time, no signal is written in the three line memories, which in turn deliver the signals written therein 1H before.

Similarly for vertical interpolation, a signal NN2 is prepared at the position of interpolation coefficient KV2 according to the outputs of the field memory and the three line memories, i.e., the signals of lines Nn+4, Nn+3, Nn+2, Nn+1.

When zooming is performed, the line memory block 2 of FIG. 2 outputs the CCD output data, currrently input, as the line L0, the output of the line memory LMA 21 as the line L1, the output of the line memory LMB 22 as the line L2, and the output of the line memory LMC 23 as the line L3.

When no zooming is performed, on the other hand, the block 2 delivers the CCD output data, currently input, as the lines L0 and L1, the output of the line memory LMA 21 as the line L2, and the output of the line memory LMB 22 as the line L3. In this case, therefore, the third line memory LMC 23 becomes unnecessary.

For savings in electric power, therefore, a logic circuit 24a is interposed between the line memory control circuit 24 and the third line memory LMC 23 for forcibly nullifying the writing and reading control signals for the line memory 23 according to the signal ZOOM representing that no vertical zoom processing is to be executed to thereby set the line memory 23 in a disabled state.

Figure 10:
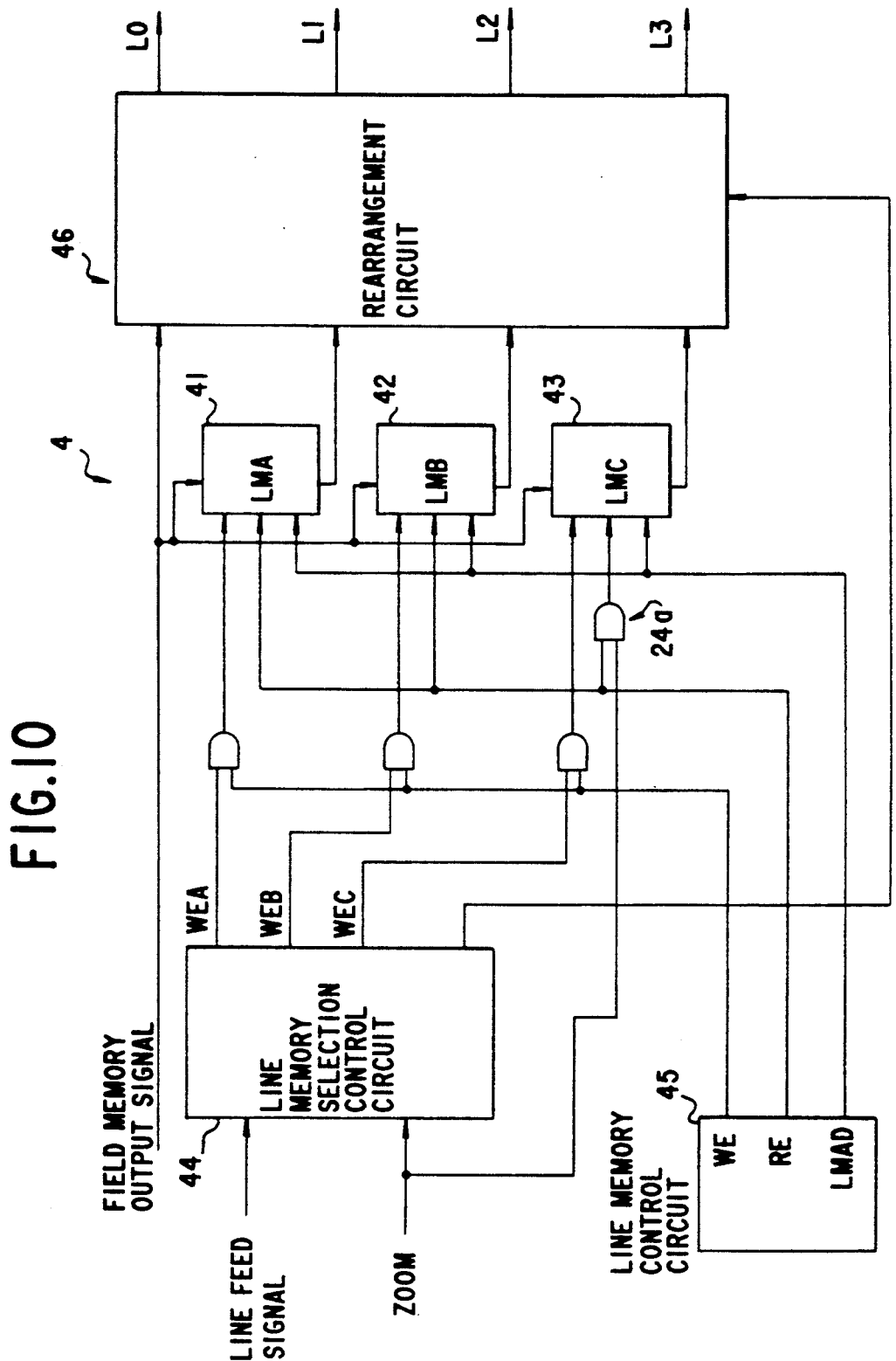
FIG. 10 is a block diagram showing another example of line memory block.
Figure 11:
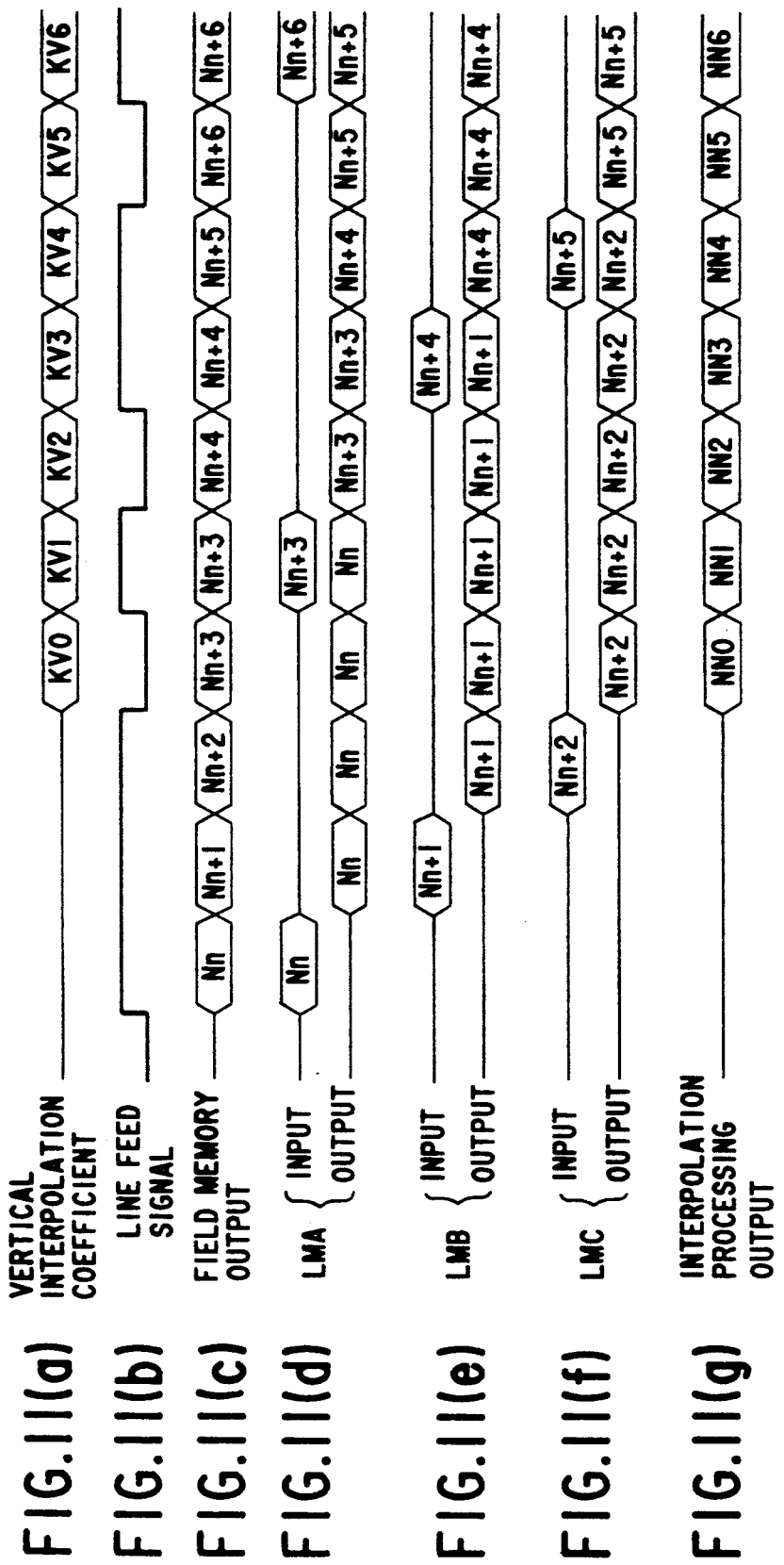
FIGS. 11(a)-(g) are timing charts showing the operation of the block of FIG. 10.

FIG. 10 shows another example of line memory block for savings in power, and FIG. 11 shows the operation of the line memory block 4.

In this case, the field memory is connected in parallel to three line memories 41, 42, 43 and a rearrangement circuit 46. When the line feed signal is "high", the output signal of the field memory is written in one of the line memories under the control of a line memory selection control circuit 44 and a line memory control circuit 45.

The field memory output signal (CCD output data) is written in the three line memories 41, 42, 43 successively cyclically in the order of LMA, LMB, LMC, LMA, . . . at an interval of 1H and then fed to the rearrangement circuit 46.

The line memory selection control circuit 44 outputs selection control signals WEA, WEB and WEC for permitting writing the signal in the respective line memories. When the line feed signal is "high", these control signals become "high" cyclically at the interval of 1H. This permits the field memory output signal to be written in the first line memory LMA 41, second line memory LMB 42 and third line memory LMC 43 successively every line in each memory.

The line memory control circuit 45 has the same construction as in FIG. 7 and produces a write enabling signal WE, read enabling signal RE and line memory address signal LMAD.

The logical product of the selection control signal WEA, WEB or WEC and the write enabling signal WE is taken and fed to the line memory 41, 42 or 43 as a writing control signal. The read enabling signal RE is sent to the line memories 41, 42, 43 as a reading control signal.

The field memory output signal and the signals read out from the line memories 41, 42, 43 are rearranged in the order of delivery from the field memory by the rearrangement circuit 46, which delivers from four output terminals the signals of the respective lines L0, L1, L2 and L3 as in FIG. 2.

Like the circuit of FIG. 2, the line memory block 4 of FIG. 10 includes a logic circuit 24a for forcibly interrupting the reading and writing control of the third line memory 43 which becomes unnecessary when no zoom processing is executed.

With the line memory block 4 described, the signal is written in only one memory at all times, so that the less frequent access to the line memories achieves a further reduction in power consumption.

The vertical interpolation block 3A of FIG. 1 is adapted to prepare from the signals of the four lines L0, L1, L2 and L3 a luminance signal YH, vertical aperture signal Vap, low-pass luminance signal YL and pair of color difference signals Cr and Cb at the position of a particular coefficient of interpolation between the lines L2 and L1.

More specifically, the fourth and fifth vertical interpolation filters 31d, 31e effect linear interpolation from the lines L0, L2 and the lines L1, L3, respectively, according to the position of interpolation. The interpolated signals are divided by the first and second Y/C separation circuits 33, 35 of the Y/C separation block 3B shown in FIG. 4 into luminance data YL1, YL2 which is the result of addition of horizontally adjacent pixels and color data C1, C2 which is the result of subtraction. The average of the luminance data YL1 and YL2 is then output as a low-pass luminance signal Y1.

On the other hand, the items of color data C1, C2 are respectively color difference signals Cr/Cb and Cb/Cr which are linear sequential signals, so that these signals are fed to the change-over circuit 37 controlled by the Cr/Cb identification signal from the ID control circuit 38. The change-over circuit 37 rearranges the color data C1, C2 to always deliver a color difference signal Cr from one of its output terminals and a color difference signal Cb from the other output terminal.

The ID control circuit 38 is initialized to a "high" or "low" state for every field depending on the LSB of the integer portion of the reading start address, i.e., on whether the start address is an odd number or even number, and the Cr/Cb identification signal is reversed every time the line feed signal becomes "high".

With the first and second vertical interpolation filters 31a, 32b of the vertical interpolation block 3A shown in FIG. 3, the interpolation coefficient is set to zero when no zoom processing is executed, and the luminance signal YH, aperture signal Vap, low-pass luminance signal Y1 and color difference signal Cr, Cb prepared each have a value on the line L2. At this time, the filter coefficient is set to zero for the line L0 in all the cases of interpolation by the interpolation block 3A of FIG. 2 to avoid the influence due to the lapping of the line L0 and the line L1.

As described above, the camera signal processing circuit of FIG. 1 makes possible Y/C separation inclusive of vertical interpolation using memories for 3 lines which are 2 lines fewer than conventionally. This makes it easy to provide the circuit in a reduced size, accordingly, in the form of a single-chip LSI. Further because the aperture signal is prepared based on data of 4 lines which are 1 line more than in the prior art, edge emphasis can be accomplished with improved accuracy with respect to the vertical direction.

Next, a description will be given of tap coefficients set in the vertical interpolation block 3A.

Figure 12:
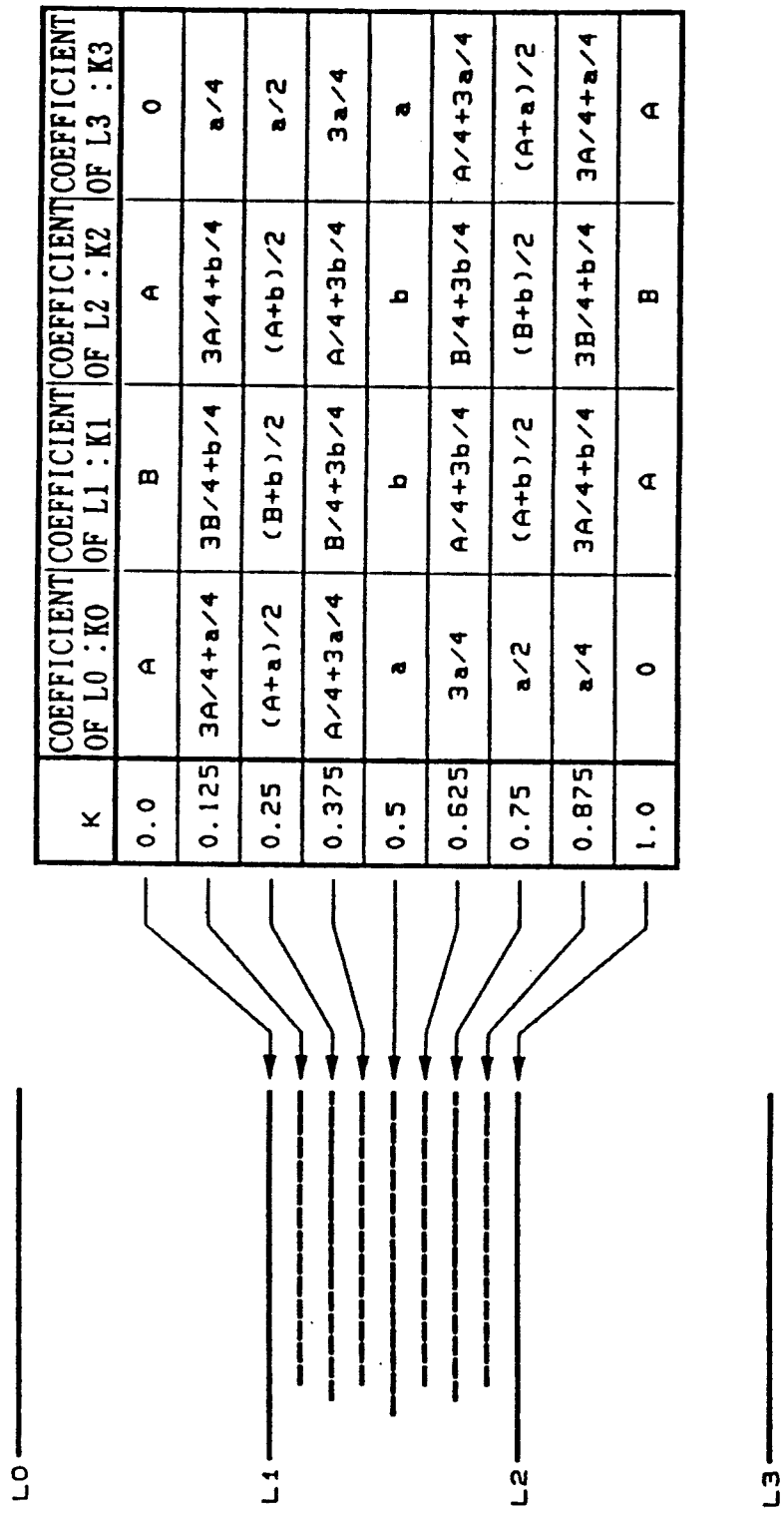
FIG. 12 is a diagram showing the relationship between vertical positions on the screen and the tap coefficients determined by first and second coefficient setting circuits.

FIG. 12 includes a table showing the relationship between interpolation coefficients K and tap coefficients K0, K1, K2 and K3. The first and second coefficient setting circuits 32a, 32b have this table incorporated therein in the form of a circuit. When an optional interpolation coefficient K is given as an input signal, the interpolation coefficient most approximate to the input coefficient is selected from among the nine interpolation coefficients in the table of FIG. 12, and the four tap coefficients corresponding to the selected coefficient are output.

With reference to FIG. 12, in the case where the interpolation coefficient is 0, 0.5 or 1.0, the tap coefficients K0, K1, K2, K3 are so determined that the signals interpolated are identical in frequency characteristics with respect to the vertical direction. More specifically, when the interpolation coefficient is 0, the tap coefficients K0, K1, K2 are set at reference values A, B, A, respectively, and the tap coefficient K3 at 0. When the interpolation coefficient is 0.5, the tap coefficients K0, K1, K2, K3 are set at reference values a, b, b, a, respectively. Further when the interpolation coefficient is 1.0, the tap coefficient K0 is set at 0, and the tap coefficients K1, K2, K3 are set at the reference values A, B, A, respectively.

When the interpolation coefficient has a decimal value other than the above values, the tap coefficients are determined by an illustrated method of linear interpolation based on the reference tap coefficients when the interpolation coefficient K is 0, 0.5 and 1.0.

Figure 14A:
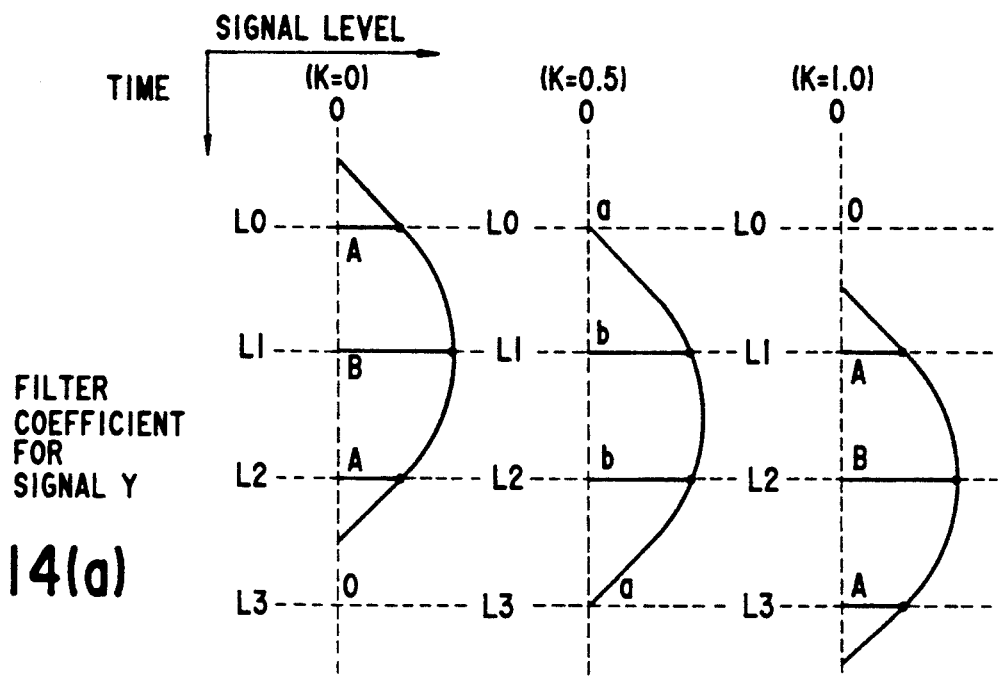
FIGS. 14(a) and 14(b) are impulse response diagrams for illustrating a method of determining tap coefficients to make the frequency characteristics of vertical interpolation filters with respect to the vertical direction.

FIGS. 14(a) and (b) illustrate a method of determining the tap coefficient reference values for the luminance signal and the aperture signal, respectively.

Figure 14B:
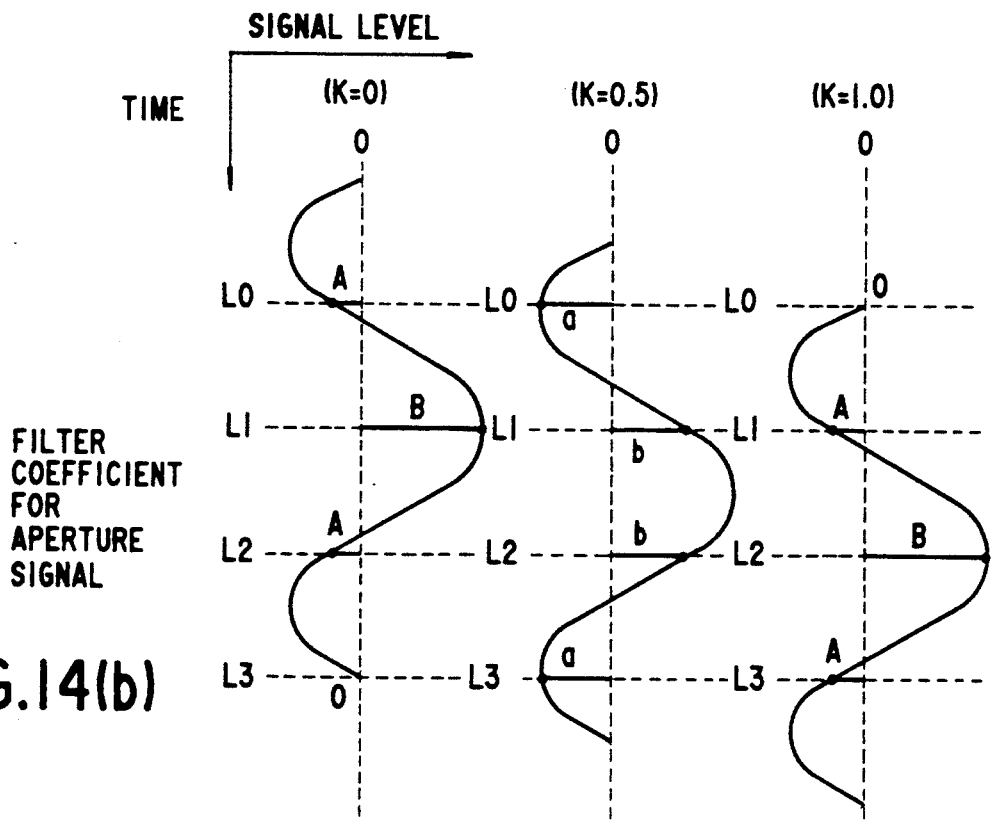

The diagrams of FIG. 14 in which time is plotted as ordinate vs. the signal level as abscissa represent desired impulse responses with respect to the luminance signal and the aperture signal. Responses of the same curve are set for interpolation coefficients K of 0, 0.5 and 1.0. The impulse response is obtained by converting on the time axis the desired frequency characteristics to be realized of the filter.

As illustrated in each diagram, the impulse response curves are identical but are displaced along the time axis such that when K=0, the lines L0 and L2 are symmetric with respect to the line L1, that when K=0.5, the lines L0 and L3 are symmetric with respect to the lines L1 and L2, and that when K=1.0, the lines L1 and L3 are symmetric with respect to the line L2.

Determined from these curves are the representative values A and B of tap coefficients in the case where the interpolation coefficient K is 0 or 1.0, and the representative values a and b of tap coefficients when the interpolation coefficient K is 0.5. As a result, the vertical interpolation filter exhibits the same frequency characteristics at the interpolation coefficients K of 0, 0.5 and 1.0 with respect of either of the luminance signal and the aperture signal.

According to the present embodiment, the tap coefficients when the interpolation coefficient is a decimal value other than the above three values are determined by linear interpolation based on the representative tap coefficient values in view of a reduction in the circuit scale. Even in this case, the characteristics of the vertical interpolation filter become higher in uniformity with respect to the vertical direction than in the case where two tap coefficient representative values for interpolation coefficients K of 0 and 1.0 are used in calculating the tap coefficients by linear interpolation for other interpolation coefficients including 0.5.

FIG. 13 shows examples of tap coefficients determined by the foregoing method for different interpolation coefficients. It is seen that irrespective of the position of interpolation, the total of the four tap coefficients K0, K1, K2, K3 is a definite value, i.e., "32" with respect to the luminance signal, and "0" in respect of the vertical aperture signal.

The first and second coefficient setting circuits 32a, 32b of FIG. 3 select the tap coefficients in accordance with the interpolation coefficient and feed the selected tap coefficients to the respective multiplying means, whereby the vertical interpolation filters are made approximately uniform in frequency characteristics regardless of the interpolation coefficient, i.e., of the vertical position on the screen to give a uniform resolution with respect to the vertical direction for the production of natural images free from irregularities.

Next, a description will be given of the setting of tap coefficients in the third to fifth vertical interpolation filters 31c, 31d, 31e.

Figure 15:
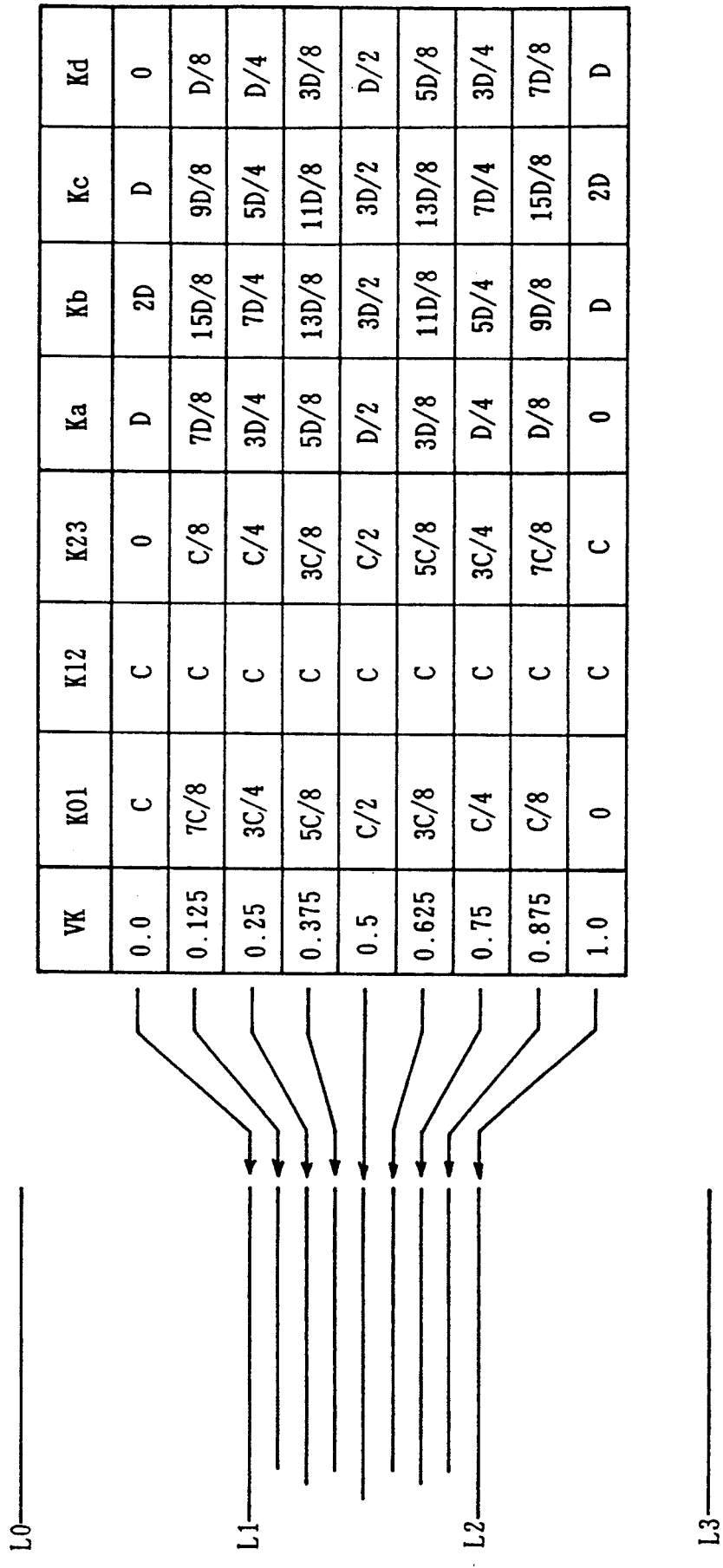
FIG. 15 is a diagram showing the relationship between vertical positions on the screen and the tap coefficients determined by third to fifth coefficient setting circuits.

FIG. 15 shows the relationship of positions of vertical interpolation and interpolation coefficients VK representing the respective interpolation positions with tap coefficients K01, K12, K23, Ka, Kb, Kc, Kd to be set by the third to fifth coefficient setting circuits 32c, 32d, 32e.

With respect to the tap coefficients K01, K12, K23 for preparing the vertical differential signal Vdf, K23=0 when the interpolation coefficient VK is 0, and interpolation is effected based on the differential signal of the line L0 and the line L1, and the differential signal of the line L1 and the line l2. At this time, K01=K12=C. When the interpolation coefficient VK is 1, K01=0, and K12=K23=C. When the interpolation coeffcient VK is in the range of 0<VK<1, the tap coefficients are determined by linear interpolation from the values when VK is 0 and 1.

As shown in FIG. 3, the third vertical interpolation filter 31c performs subtraction by its subtracting device, multiplication of the tap coefficients and addition of the products, whereby the calculation of the mathematical expression 4 and interpolation are realized at the same time.

As to the tap coefficients Ka, Kb, Kc, Kd for preparing the foregoing signals S1, S2, Ka=Kc=D, Kb=2D and Kd=0, and interpolation is performed from the signals of three lines L0, L1, L2, when the interpolation coefficient VK is 0. As a result, the signal S1 is given the average value of the lines L0 and L2, and the signal S2, the value of the line L1. When the interpolation coefficient VK is 1, Ka=0, Kb=Kd=D, Kc=2D, and interpolation is performed from the signals of three lines L1, L2, L3. This gives the value of line L2 to the signal S1, and the average value of lines L1 and L3 to the signal S2. When the interpolation coefficient VK is in the range of 0<VK<1, the values when the coefficient VK is 0 and 1 are used for linear interpolation.

FIG. 16 shows examples of tap coefficients K01, K12, K23, Ka, Kb, Kc, Kd determined by the above method for different interpolation coefficients. The table indicates that the sum of the coefficients of every interpolation filter remains unaltered irrespective of the position of interpolation and is constant.

Next, the construction of the false color signal suppression circuit 103 shown in FIG. 5 will be described in greater detail.

As shown in FIG. 17, the suppression circuit 103 generally comprises a control signal preparing portion 111, high-luminance portion suppressor 112 and color gain controller 113.

In the control signal preparing portion 111, the vertical aperture signal Vap and the vertical differential signal Vdf are fed to circuits 114, 115, respectively, for conversion to absolute values and thereafter combined by an adder 116. A predetermined level THc is subtracted by a subtracting device 117 from the resulting signal, and a portion of the signal below zero level is further cut off by an underflow clipping circuit 118.

The combined signal is processed by the subtracting device 117 to suppress the color signal gain only when the sum of absolute values of the signals Vap and Vdf is greater than the predetermined level THc and to avoid impaired color reproduction that would result if the color signal gain is controlled when the absolute values are small. The signal is processed by the underflow clipping circuit 118 to prevent occurrence of a control signal of minus sign by the subtraction.

The output signal of the underflow clipping circuit 118 is fed to a selection circuit 123 by way of a direct channel 119 and bit shift circuits 120, 121, 122 for giving twofold, fourfold and eightfold gains, respectively. In accordance with a control signal Kc, the circuit 123 selects one of onefold, twofold, fourfold and eightfold gains. The signal with the selected gain is applied to an overflow clipping circuit 124, which cuts off a value in excess of 255 level corresponding to the greatest gain of 8-bit color signal.

Figure 18A:
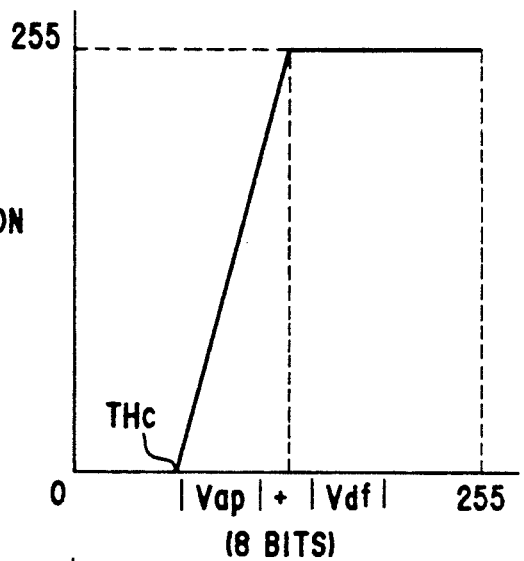
FIGS. 18, (A), (B) and (C) are graphs showing the characteristics of a color suppression control signal, gain adjusting signal and color signal gain, respectively.

Consequently, a color suppression control signal is prepared with the characteristics shown in FIG. 18(A) and is fed to a multiplying device 134 constituting the high-luminance portion suppressor 112 of FIG. 17.

The bit shift circuits 120 to 122 and the selection circuit 123 serve to variously set the characteristics of the color suppression control signal shown in FIG. 18(A) in accordance with the characteristics of the video camera.

In the high-luminance portion suppressor 112 of FIG. 17, a predetermined level THy is subtracted from the luminance signal YH by a subtracting device 125, which in turn feeds an output signal to a selection circuit 130 via a direct channel 126 and bit shift circuits 127,128, 129 for giving twofold, fourfold and eightfold gains, respectively. The circuit 130 selects one of onefold, twofold, fourfold and eightfold gains in accordance with a selection signal Ky. The signal with the selected gain is applied to an overflow clipping circuit 131, which cuts off a value exceeding 255 level corresponding to the greatest gain of 8-bit luminance signal. The signal thereafter has all bits thereof inverted by an inversion circuit 132 and is fed to a selection circuit 133. This selection circuit 133 is controlled by a borrow output of the subtracting device 125 and outputs a signal of fixed level "255" in place of the output signal of the inversion circuit 132 when the luminance signal YH is smaller than the predetermined level THy.

Figure 18B:
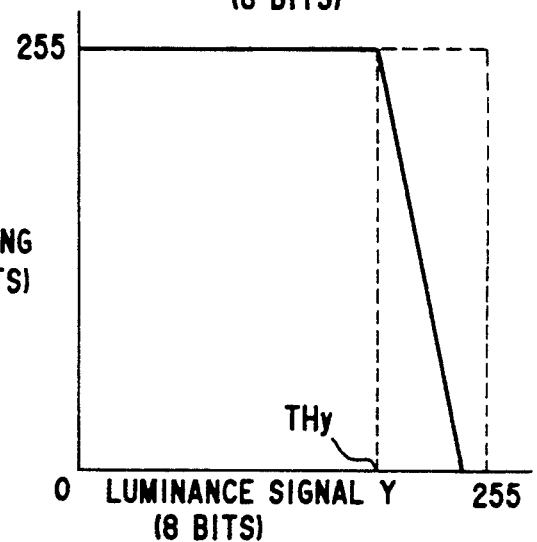

Accordingly, the output signal of the selection circuit 133 has the characteristics shown in FIG. 18(B). This signal is given to the multiplying device 134 shown in FIG. 17 and acts as a gain adjusting signal for the color suppression control signal delivered from the control signal preparing portion 111.

The control signal output from the multiplying device 134 has all bits thereof inverted by an inversion circuit 135 and is thereafter given to a multiplying device 136 constituting the color gain controller 113 to control the gain of the RGB signals obtained from the foregoing gamma correction circuit.

Figure 18C:
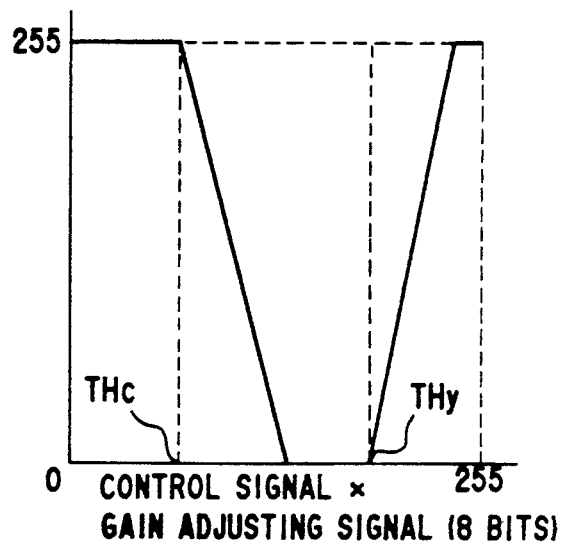
Figure 20:
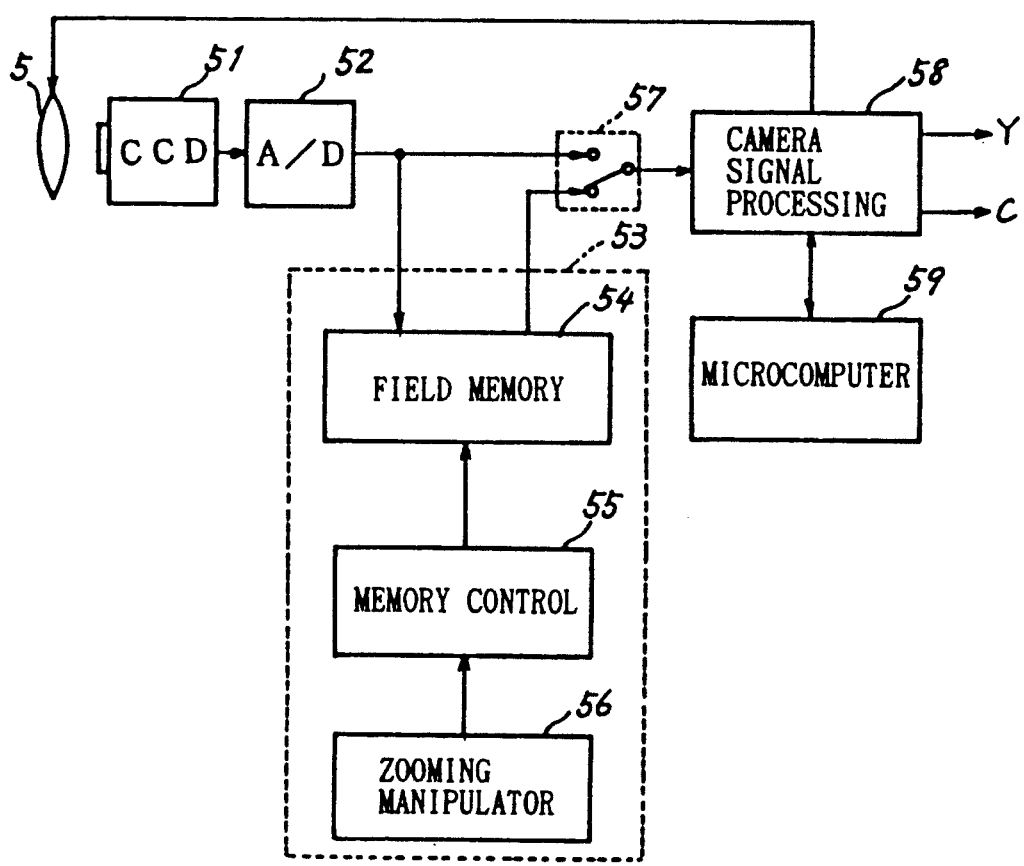
FIG. 20 is a block diagram showing the construction of a conventional video camera.
Figure 21:
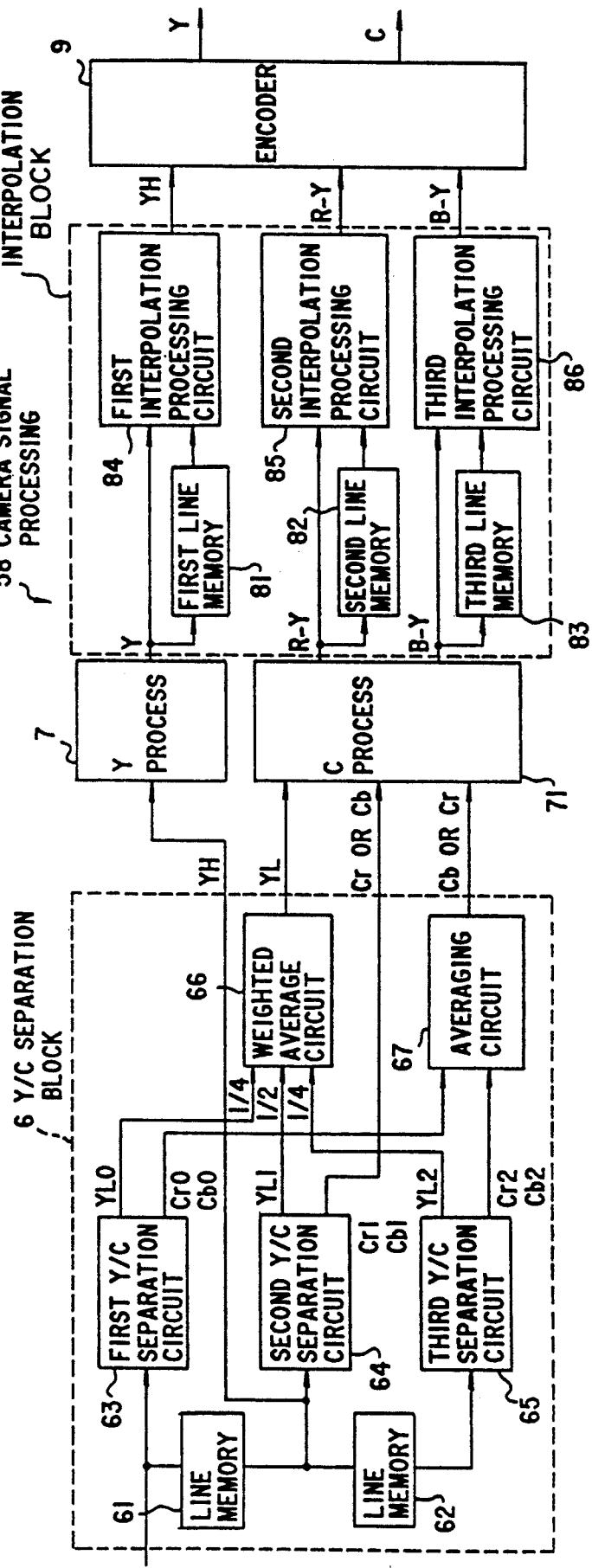
FIG. 21 is a block diagram showing the construction of a conventional camera signal processing circuit.

Accordingly, the RGB signals delivered from the multiplying device 136 has the color signal gain shown in FIG. 18(C).

More specifically, in a state wherein the absolute value |Vap| of the vertical aperture signal and the absolute value |Vdf| of the vertical differential signal are both small, i.e., if the signal has slight false color signals, it is output with its level unaltered. In a state in which the sum of the absolute values |Vap|+|Vdf| is considerably great, i.e., if false color signals of objectionable level are present, the RGB signal is output with its level suppressed. Further if the sum of the absolute values |Vap|+|Vdf| is still greater, no suppression is made on the RGB signal, the signal is output with its level unaltered. The reason for the gain adjustment of FIG. 18(B) will be described later.

For the following reason, the sum of the absolute values of the vertical aperture signal and the vertical differential signal, i.e., |Vap|+|Vdf|, is used instead of the absolute value |Vdf| of the vertical differential signal only. As already stated, it is basically possible to suppress false color signals by using |Vdf| only, but it is likely that when false color signals are present in three consecutive lines, the middle line L2 will be greater than the other two lines L1, L2 in |Vdf| as shown in FIG. 24(K). If |Vdf| only is then used for preparing the control signal, the color of the line L2 will be suppressed to excess to produce an unnatural image. This objection is obviated by adding |Vap|, which is small in the line L2, to |Vdf|.

The gain is adjusted as shown in FIG. 18(B) by the high-luminance portion suppressor 112 of FIG. 17 for the following reason. With the image pickup device having the complementary color filter shown in FIG. 25(A), the output signal of the odd-numbered field is represented by the same drawing, (B). Suppose an image has uniform values of R=10, G=B=5. The CCD output signal then involves the levels shown in FIG. 25, (C). If the level of all pixels at this time is within the dynamic range of the AD converter (not shown) for digitalizing the CCD output analog signals, the level of the digital signal as AD-converted remains as it is, giving a low-pass luminance signal YL shown in FIG. 25(D). However, if the dynamic range of the AD converter circuit is as low as "25" the level of the digital signal as converted will involve the variations shown in FIG. 25(E). The resulting low-pass luminance signal YL then has values shown in FIG. 25(F) which differ from the corresponding original values shown in FIG. 25(D), giving rise to a luminance difference (horizontal stripe) in every line. The luminance difference produces a vertical aperture signal Vap, so that the addition of the signal Vap makes the luminance difference futher greater. Accordingly, if the signals Vap and Vdf are used for the color suppression control signal as they are, the portion of the horizontal stripe becomes completely colorless to make the stripe conspicuous. According to the present embodiment, therefore, the gain adjustment made by the high-luminance portion suppressor 112 precludes excessive color suppression at the high-luminance portion as shown in FIG. 18(C).

The false color signal can be detected and suppressed also by using the vertical differential signal Vdf only. Even in this case, the false color signal can be suppressed more reliably than when the vertical aperture signal Vap only is used.

When the horizontal aperture signal Hap as converted to an absolute value is added to the output signal of the adder 116 shown in FIG. 17 the false color signal can also be suppressed also with respect to the horizontal direction.

The false color signal suppression circuit 103 detects occurrence of false color signals based on a linear differential signal of the luminance signal with respect to the vertical direction. This makes it possible to reliably locate and suppress false color sigals even at portions where the luminance varies gently with a color change.

During electronic zooming operation, a false color signal suppressing operation is conducted uniformly with respect to the vertical direction by effecting interpolation at positions of interpolation, This eliminates the likelihood of suppression irregularities at the position of interpolation.

The foregoing embodiments are given for the description of the present invention and should not be interpreted as limiting the invention as defined in the appended claims or reducing the scope thereof. The components of the circuit of the invention are not limited to those of the embodiments in construction but can of course be modified variously by one skilled in the art without departing from the spirit of the invention as defined in the claims.

What is claimed is:

1. In a video camera comprising an image pickup device having a mosaic color filter and a field memory for storing an image output from the pickup device on conversion to a CCD output digital signal, the camera being adapted to vertically interpolate said CCD output digital signal as read out from the field memory in corresponding relation with an image area to be processed for zooming and to produce a luminance signal and color difference signals for each of horizontal scan lines for forming a zoomed image, a video camera circuit comprising:

a field memory control circuit for reading out from the field memory said CCD output digital signal of the lower-most of four consecutive horizontal scan lines on a screen of a monitor presenting the image, said scan lines consisting of two lines above and two lines below a new position of vertical interpolation when the position of interpolation has changed, first, second and third line memories connected to an output terminal of the field memory for storing first, second and third digital signals of three horizontal scan lines, respectively, from the field memory each from line to line, a line memory control circuit connected between said field memory control circuit and said first, second and third line memories for controlling writing in and reading out of data from the first, second and third line memories to concurrently retrieve said first, second and third digital signals of the three of the four horizontal scan lines, a vertical interpolation circuit connected to the four horizontal scan lines for preparing an interpolated digital signal on a horizontal scan line at the position of interpolation based on said first, second, third and CCD output digital signals, respectively, of the four horizontal scan lines, said vertical interpolation circuit including a plurality of filters used in preparing said interpolated digital signal, and a Y/C separation circuit connected to an output of two of said filters for separating a luminance signal and color difference signals from said interpolated digital signal at the interpolation position to output the separated signals.

2. A video camera circuit as defined in claim 1 wherein between the line memory control circuit and said third line memory, a circuit is interposed for forcibly nullifying writing and reading control signals for said third line memory in accordance with a signal representing that no vertical zoom processing is to be executed.

3. A video camera circuit for producing a video signal at a predetermined vertical position in an image area by vertical interpolation based on a CCD output signal obtained by converting an output from a solid image pickup device (CCD) to a digital signal, the video camera circuit comprising:

first, second and third line memory means connected in series with an output terminal for the CCD output signal, and vertical interpolation filter means for receiving the CCD output signal and output signals from the respective first, second and third line memory means as output signals of four lines and effecting vertical interpolation at a vertical position between the middle two of the four lines based on the output signals of the four lines.

4. A video camera circuit as defined in claim 3 wherein the vertical interpolation filter means includes coefficient setting circuits for selectively setting four tap coefficients to be multiplied respectively by the output signals of the four lines to obtain substantially constant frequency characteristics irrespective of the position of vertical interpolation.

5. A video camera circuit for processing an image signal from an image pickup device having a mosaic color filter, comprising:

means operable based on the image signal on a plurality of horizontal scan lines consecutive with respect to a vertical direction for detecting a linear differential signal of a luminance signal contained in the image signal with respect to the vertical direction, means for preparing a control signal for suppressing a false color signal produced with respect to the vertical direction and attributable to the color filter, upon the absolute value of the linear differential signal exceeding a predetermined value, and means for suppressing a color signal contained in the image signal in accordance with the control signal.

6. A video camera circuit as defined in claim 5 wherein the image pickup device has connected to an output terminal thereof a vertical interpolation circuit for enlarging a predetermined field angle within an image screen area by interpolation, the vertical interpolation circuit having a vertical interpolation filter for effecting vertical interpolation and detecting the linear differential signal at the same time based on the image signal of four horizontal scan lines which are two lines above and two lines below a position of interpolation, the vertical interpolation filter constituting the linear differential signal detecting means.

7. A video camera circuit as defined in claim 5 wherein the linear differential signal detecting means has a plurality of line memory means connected in series with an output terminal of the image pickup device, and calculating means for preparing a differential signal between output signals of two lines included in output signals delivered from the line memory means in vertically consecutive three lines, the two lines being other than the middle line of the three lines, and the differential signal is detected as the linear differential signal.

8. A video camera circuit as defined in claim 5 further including means for adjusting gain of the control signal so as to discontinue suppression of the false color signal or reduce the degree of suppression when the luminance signal contained in the image signal is in excess of a predetermined level.

9. A video camera circuit for processing an image signal from an image pickup device having a mosaic color filter, the circuit comprising:

means for preparing from the image signal on a plurality of horizontal scan lines arranged in a vertical direction a linear differential signal and a quadratic differential signal of a luminance signal with respect to the vertical direction, means for preparing a control signal for suppressing a false color signal produced with respect to the vertical direction and attributable to the color filter, upon the sum of the absolute value of the linear differential signal and the absolute value of the quadratic differential signal exceeding a predetermined value, and means for suppressing a color signal contained in the image signal in accordance with the control signal.

10. A video camera circuit as defined in claim 9 wherein the image pickup device has connected to an output terminal thereof a vertical interpolation circuit for enlarging a predetermined field angle within an image screen area by interpolation, the vertical interpolation circuit having a first vertical interpolation filter for effecting vertical interpolation and detecting the linear differential signal at the same time based on the image signal of four horizontal scan lines which are two lines above and two lines below a position of interpolation, and a second vertical interpolation filter for effecting vertical interpolartion and detecting the quadratic differential signal at the same time based on the image signal on the four horizontal scan lines, the two vertical interpolation filters constituting the linear differential signal preparing means and the quadratic differential signal preparing means.

11. A video camera circuit as defined in claim 9 further including means for adjusting gain of the control signal so as to discontinue suppression of the false color signal or reduce the degree of suppression when the luminance signal contained in the image signal is in excess of a predetermined level.

* * * * *